(12) United States Patent
Zheng

(10) Patent No.: US 12,456,268 B2
(45) Date of Patent: Oct. 28, 2025

(54) AUGMENTED REALITY DISPLAY DEVICE AND NEAR-EYE DISPLAY DEVICE

(71) Applicant: GUANGDONG OPPO MOBILE TELECOMMUNICATIONS CORP., LTD., Guangdong (CN)

(72) Inventor: Guang Zheng, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 273 days.

(21) Appl. No.: 18/362,665

(22) Filed: Jul. 31, 2023

(65) Prior Publication Data

US 2023/0377292 A1   Nov. 23, 2023

Related U.S. Application Data

(63) Continuation of application No. PCT/CN2022/071839, filed on Jan. 13, 2022.

(30) Foreign Application Priority Data

Feb. 9, 2021 (CN) .................... 202110177023.X
Feb. 9, 2021 (CN) .................... 202120373464.2

(51) Int. Cl.
  *G06T 19/00* (2011.01)
  *G02B 6/10* (2006.01)
  *G02B 27/01* (2006.01)

(52) U.S. Cl.
  CPC ............ *G06T 19/006* (2013.01); *G02B 6/105* (2013.01); *G02B 27/0172* (2013.01); *G02B 2027/0178* (2013.01)

(58) Field of Classification Search
  CPC .. G06T 19/006; G02B 6/105; G02B 27/0172; G02B 2027/0178; G02B 27/4272
  See application file for complete search history.

(56) References Cited

U.S. PATENT DOCUMENTS 10,534,209 B1 *   1/2020   Fu ................... G02B 27/0172
10,557,994 B1    2/2020   Lee
(Continued)

FOREIGN PATENT DOCUMENTS

CN     110537136    12/2019
CN     111025657    4/2020
(Continued)

OTHER PUBLICATIONS

WIPO, International Search Report and Written Opinion for International Application No. PCT/CN2022/071839, Mar. 28, 2022.
(Continued)

*Primary Examiner* — Grace Q Li
(74) *Attorney, Agent, or Firm* — Hodgson Russ LLP

(57) ABSTRACT

An augmented reality (AR) display device and a near-eye display device are provided. The AR display device includes a waveguide substrate, an in-coupling grating, a turn grating, and an out-coupling grating. The in-coupling grating is disposed on the waveguide substrate. A grating vector of the in-coupling grating is a first vector K1. The turn grating is disposed on the waveguide substrate. A grating vector of the turn grating is a second vector K2. The out-coupling grating is disposed on the waveguide substrate. A grating vector of the out-coupling grating is a third vector K3. The first vector K1, the second vector K2, and the third vector K3 form a closed vector triangle. An angle A between the third vector K3 and a horizontal direction X satisfies: $-45° \leq A \leq 45°$ when the AR display device 1 is used.

19 Claims, 13 Drawing Sheets

(56) References Cited

U.S. PATENT DOCUMENTS

| | | | |
|---|---|---|---|
| 12,135,428 B2 * | 11/2024 | Kasegawa | G02B 6/0076 |
| 2020/0057307 A1 | 2/2020 | Yoshikaie | |
| 2020/0081246 A1 | 3/2020 | Olkkonen et al. | |
| 2020/0264378 A1 | 8/2020 | Grant et al. | |
| 2021/0333551 A1 * | 10/2021 | Schultz | G02B 30/34 |
| 2022/0075195 A1 * | 3/2022 | Schultz | G02B 27/0081 |
| 2022/0091323 A1 * | 3/2022 | Yaroshchuk | G02B 6/29304 |
| 2022/0099977 A1 * | 3/2022 | Meitav | G02B 6/0031 |

FOREIGN PATENT DOCUMENTS

| | | |
|---|---|---|
| EP | 3671320 | 6/2020 |
| WO | 2020009788 A1 | 1/2020 |
| WO | 2020149053 | 7/2020 |
| WO | 2020217044 | 10/2020 |

OTHER PUBLICATIONS

EPO, Extended European Search Report for EP Application No. 22752072.3, Jun. 27, 2024.
CNIPA, Second Office Action for CN Application No. 202110177023. X, Mar. 29, 2025.
CNIPA, Rejection Decision for CN Application No. 202110177023. X, Jun. 7, 2025.
CNIPA, First Office Action issued in CN Application No. 202110177023. X, Nov. 16, 2024.

* cited by examiner $\varphi$ = SOLAR ELEVATION ANGLE

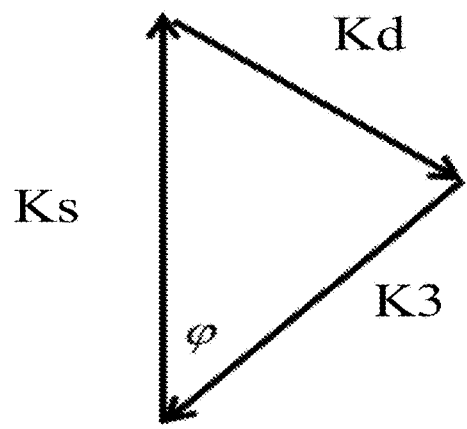
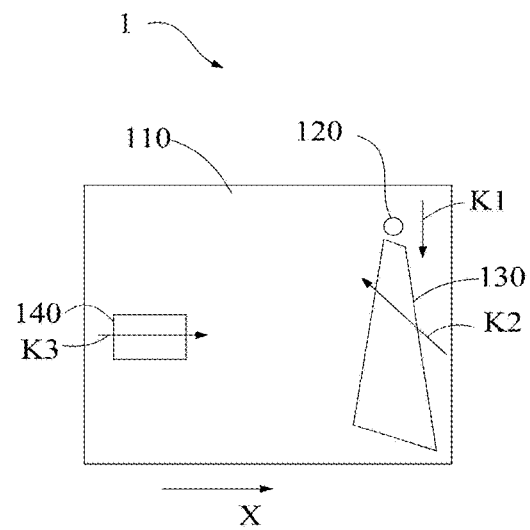
FIG. 16     FIG. 17
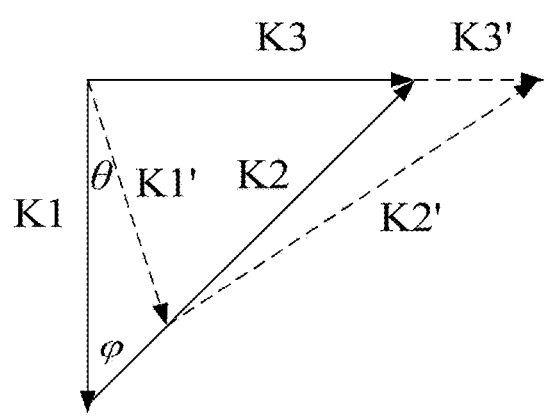
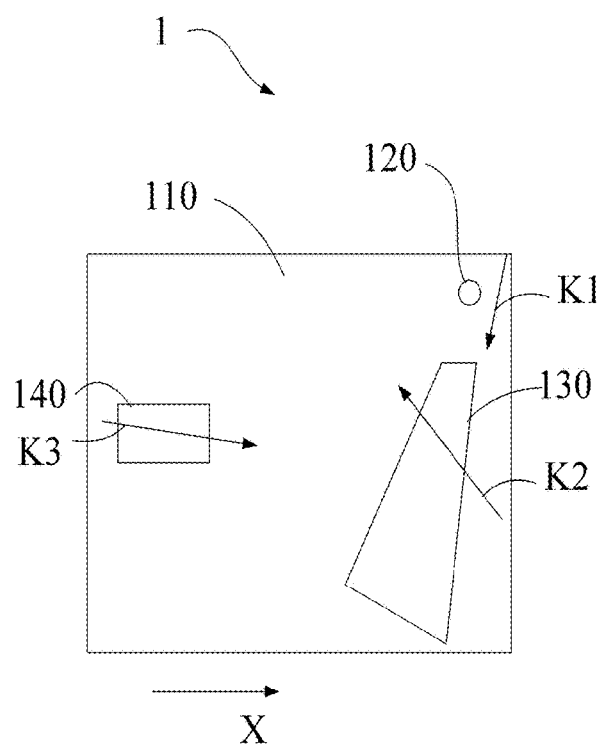
FIG. 18     FIG. 19

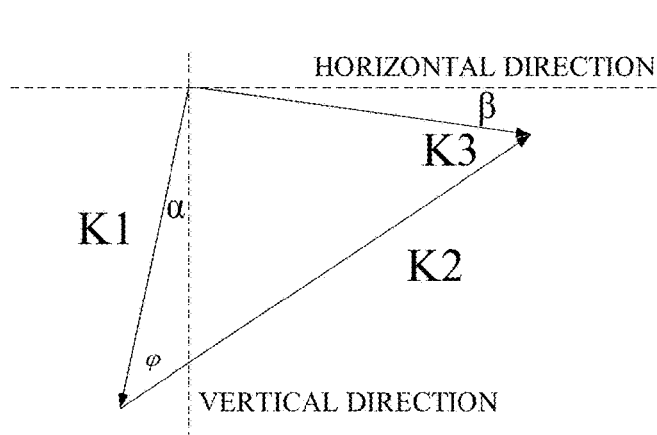
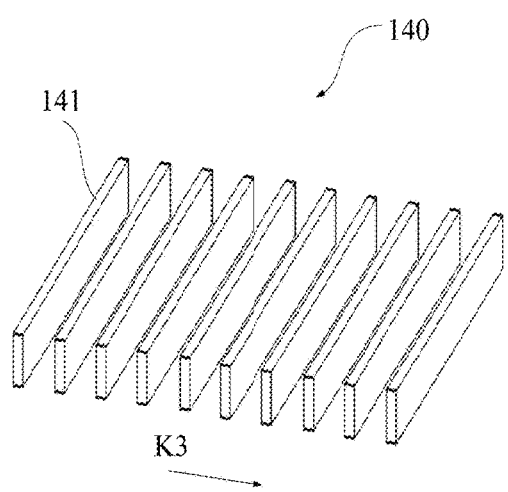
FIG. 20
FIG. 21
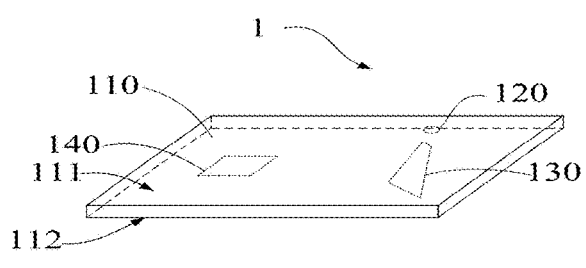
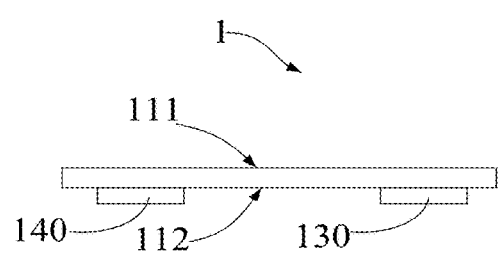
FIG. 22
FIG. 23

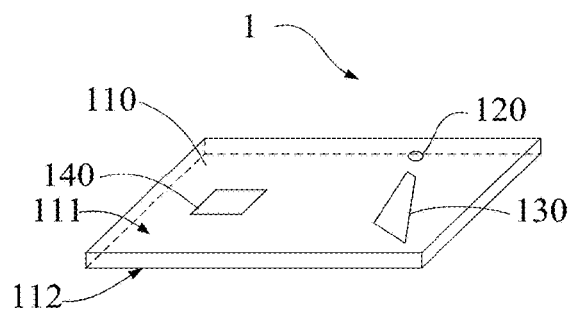
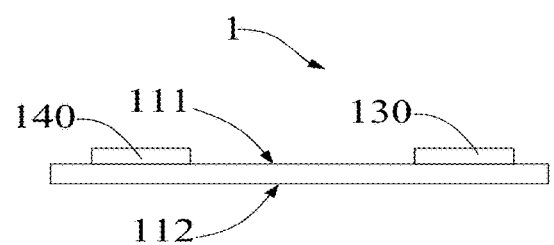
FIG. 24    FIG. 25
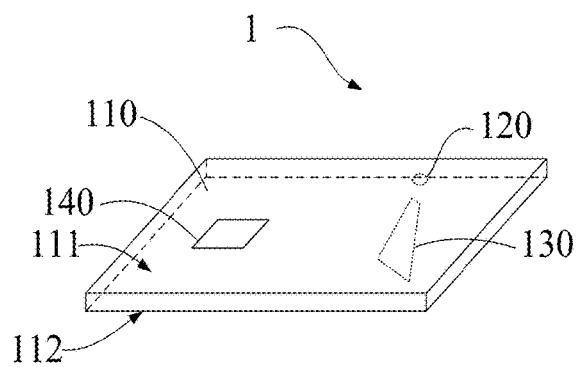
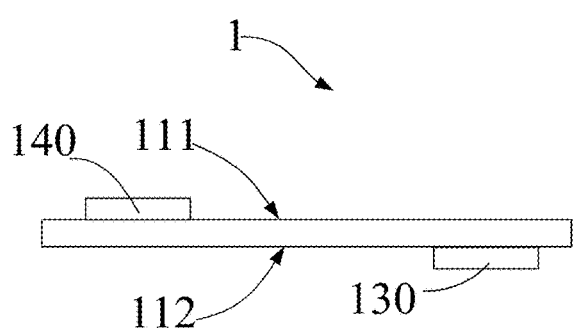
FIG. 26    FIG. 27

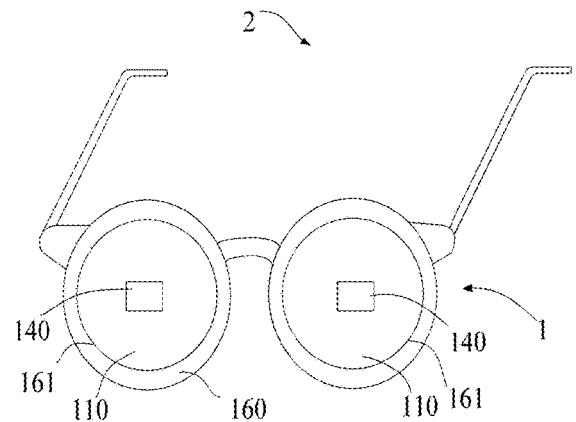
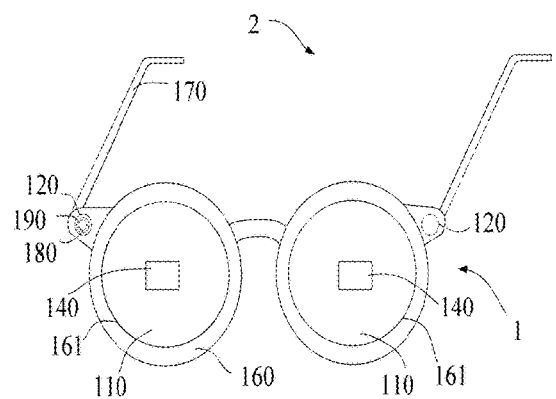
FIG. 32  FIG. 33
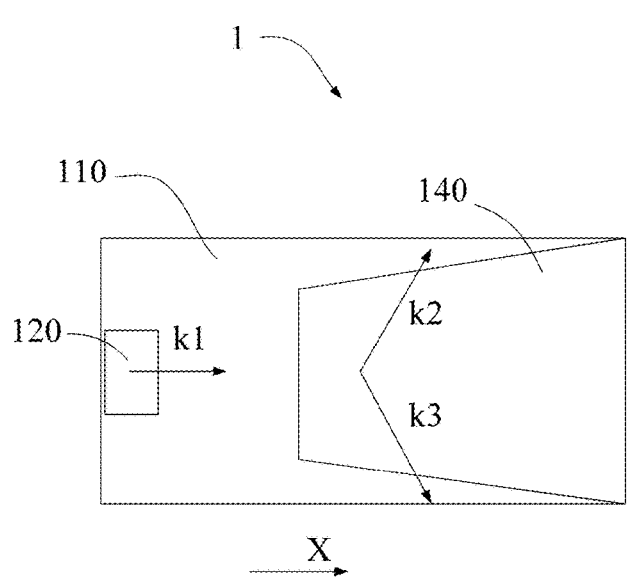
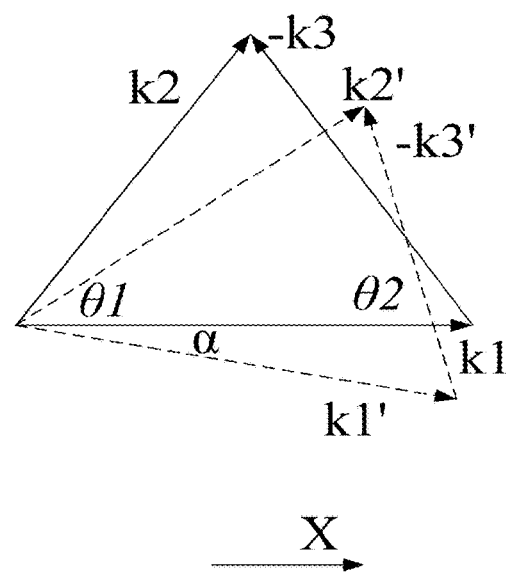
FIG. 34  FIG. 35

AUGMENTED REALITY DISPLAY DEVICE AND NEAR-EYE DISPLAY DEVICE

CROSS-REFERENCE TO RELATED APPLICATIONS

This application is a continuation of International Application No. PCT/CN2022/071839, filed Jan. 13, 2022, which claims priority to Chinese Patent Application No. 202120373464.2, filed Feb. 9, 2021 and Chinese Patent Application No. 202110177023.X, filed Feb. 9, 2021, the entire disclosures of which are hereby incorporated by reference.

TECHNICAL FIELD

The disclosure relates to the technical field of augmented reality (AR) display, and in particular, to an AR display device and a near-eye display device.

BACKGROUND

With development of technologies, augmented reality (AR) display devices, such as AR glasses, can not only see external real world, but also need to see virtual images. A real scene and virtual information are fused to reinforce each other and "enhance" each other. However, when a user uses the AR display device, for example, when wearing the AR glasses, external ambient light is dispersed into a rainbow pattern, and light dispersed enters eyes of the user, such that the user sees the rainbow pattern, and this phenomenon is called a rainbow effect. When the user sees the rainbow pattern, use experience of the user is affected at the very least, and the eyes of the user are hurt in severe cases.

SUMMARY

In a first aspect, an augmented reality (AR) display device is provided in the disclosure. The AR display device includes a waveguide substrate, an in-coupling grating, a turn grating, and an out-coupling grating. The in-coupling grating is disposed on the waveguide substrate and is configured to couple light into the waveguide substrate. A grating vector of the in-coupling grating is a first vector K1. The turn grating is disposed on the waveguide substrate and is configured to perform pupil expansion on the light coupled into the waveguide substrate by the in-coupling grating. A grating vector of the turn grating is a second vector K2. The out-coupling grating is disposed on the waveguide substrate. The out-coupling grating is configured to receive the light that is subject to the pupil expansion by the turn grating and couple the light out of the waveguide substrate. A grating vector of the out-coupling grating is a third vector K3. The first vector K1, the second vector K2, and the third vector K3 form a closed vector triangle. An angle A between the third vector K3 and a horizontal direction X satisfies: $-45° \leq A \leq 45°$ when the AR display device is used.

In a second aspect, an AR display device is provided in the disclosure. The AR display device includes a waveguide substrate, an in-coupling grating, and an out-coupling grating. The in-coupling grating is disposed on the waveguide substrate and configured to couple light into the waveguide substrate. A grating vector of the in-coupling grating is a first vector k1. The out-coupling grating is disposed on the waveguide substrate and configured to couple the light in the waveguide substrate out of the waveguide substrate. The out-coupling grating has a second vector k2 and a third vector k3. The first vector k1, the second vector k2, and the third vector k3 form a closed vector triangle. When the AR display device 1 is used, an angle between the second vector k2 and a horizontal direction X is less than or equal to 45°, and an angle between the third vector k3 and the horizontal direction X is less than or equal to 45°.

In a third aspect, a near-eye display device is provided in the disclosure. The near-eye display device includes an AR display device. The AR display device includes a waveguide substrate, an in-coupling grating, a turn grating, and an out-coupling grating. The in-coupling grating is disposed on the waveguide substrate and is configured to couple light into the waveguide substrate. A grating vector of the in-coupling grating is a first vector K1. The turn grating is disposed on the waveguide substrate and is configured to perform pupil expansion on the light coupled into the waveguide substrate by the in-coupling grating. A grating vector of the turn grating is a second vector K2. The out-coupling grating is disposed on the waveguide substrate. The out-coupling grating is configured to receive the light that is subject to the pupil expansion by the turn grating and couple the light out of the waveguide substrate. A grating vector of the out-coupling grating is a third vector K3. The first vector K1, the second vector K2, and the third vector K3 form a closed vector triangle. An angle A between the third vector K3 and a horizontal direction X satisfies: $-45° \leq A \leq 45°$ when the AR display device is used.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiments described herein.

BRIEF DESCRIPTION OF THE DRAWINGS

FIG. 16 is a schematic diagram illustrating superposition of vectors in FIG. 13.

FIG. 17 is a schematic diagram of an AR display device provided in an implementation of the disclosure.

FIG. 18 is a schematic diagram illustrating light propagation of the AR display device illustrated in FIG. 17.

FIG. 19 is a schematic diagram of an AR display device provided in an implementation of the disclosure.

FIG. 20 is a schematic diagram illustrating light propagation of the AR display device illustrated in FIG. 19.

FIG. 21 is a schematic structural view of an out-coupling grating provided in an implementation.

FIG. 22 is a schematic perspective diagram of an AR display device provided in another implementation of the disclosure.

FIG. 23 is a side view of the AR display device in FIG. 22.

FIG. 24 is a schematic perspective diagram of an AR display device provided in yet another implementation of the disclosure.

FIG. 25 is a side view of the AR display device in FIG. 24.

FIG. 26 is a schematic perspective diagram of an AR display device provided in yet another implementation of the disclosure.

FIG. 27 is a partial side view the AR display device in FIG. 26.

FIG. 32 is a schematic diagram of a near-eye display device provided in an implementation of the disclosure.

FIG. 33 is a schematic diagram of a near-eye display device provided in another implementation of the disclosure.

FIG. 34 is a schematic diagram of an AR display device provided in yet another implementation of the disclosure.

FIG. 35 is a schematic diagram illustrating superposition of the vectors of the AR display device illustrated in FIG. 34.

DETAILED DESCRIPTION

Figure 1:
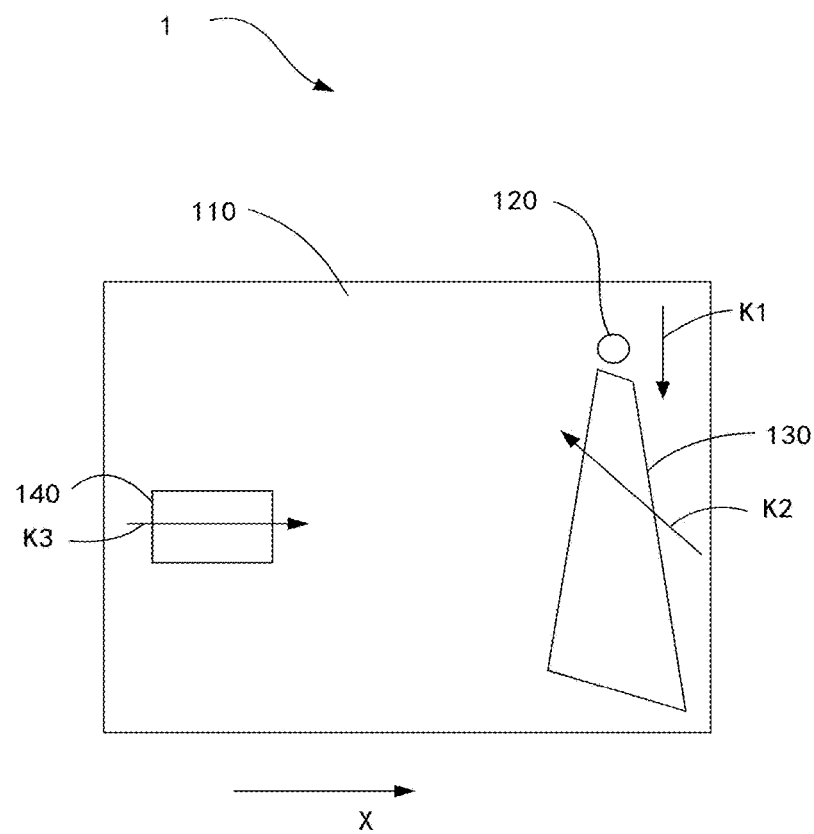
FIG. 1 is a schematic diagram of an augmented reality (AR) display device provided in an implementation of the disclosure.

In a first aspect, an augmented reality (AR) display device is provided in the disclosure. The AR display device includes a waveguide substrate, an in-coupling grating, a turn grating, and an out-coupling grating. The in-coupling grating is disposed on the waveguide substrate and is configured to couple light into the waveguide substrate. A grating vector of the in-coupling grating is a first vector K1. The turn grating is disposed on the waveguide substrate and is configured to perform pupil expansion on the light coupled into the waveguide substrate by the in-coupling grating. A grating vector of the turn grating is a second vector K2. The out-coupling grating is disposed on the waveguide substrate. The out-coupling grating is configured to receive the light that is subject to the pupil expansion by the turn grating and couple the light out of the waveguide substrate. A grating vector of the out-coupling grating is a third vector K3. The first vector K1, the second vector K2, and the third vector K3 form a closed vector triangle. An angle A between the third vector K3 and a horizontal direction X satisfies: $-45° \leq A \leq 45°$ when the AR display device is used.

The angle A between the direction of the third vector K3 and the horizontal direction X satisfies: $-30° \leq A \leq 30°$.

The out-coupling grating includes a plurality of out-coupling units arranged at regular intervals, and an interval of the out-coupling grating is less than or equal to 450 nm.

A region of the out-coupling grating is in a shape of rectangle, and a length of a side of the rectangle satisfies: $d=m+l*\tan(FOV/2)*2$, where d represents the length of the side of the rectangle, m represents an eye movement range of a user, l represents a distance from eyes of the user to a waveguide plate, and FOV represents a field of vision of an AR display system.

An interval of the out-coupling grating is the same as that of the in-coupling grating.

The in-coupling grating and the out-coupling grating are disposed at a same side of the waveguide substrate, or disposed at two opposite sides of the waveguide substrate, respectively.

The out-coupling grating and the waveguide substrate are integrally formed.

An appearance of the out-coupling grating is any one of a blazed grating, a slanted grating, a binary grating, or a photonic crystal.

The AR display device further includes a polarizer. Light exited from the polarizer enters the out-coupling grating, and a polarization direction of the polarizer is the horizontal direction X.

The waveguide substrate has an outer surface and an inner surface opposite the outer surface. The polarizer and the out-coupling grating are disposed on the outer surface of the waveguide substrate, and the polarizer is farther away from the waveguide substrate than the out-coupling grating.

The waveguide substrate has an outer surface and an inner surface opposite the outer surface. The polarizer is disposed on the outer surface of the waveguide substrate, and the out-coupling grating is disposed on the inner surface of the waveguide substrate.

The polarizer is a coated polarizer.

In a second aspect, an AR display device is provided in the disclosure. The AR display device includes a waveguide substrate, an in-coupling grating, and an out-coupling grating. The in-coupling grating is disposed on the waveguide substrate and configured to couple light into the waveguide substrate. A grating vector of the in-coupling grating is a first vector k1. The out-coupling grating is disposed on the waveguide substrate and configured to couple the light in the waveguide substrate out of the waveguide substrate. The out-coupling grating has a second vector k2 and a third vector k3. The first vector k1, the second vector k2, and the third vector k3 form a closed vector triangle. When the AR display device 1 is used, an angle between the second vector k2 and a horizontal direction X is less than or equal to 45°, and an angle between the third vector k3 and the horizontal direction X is less than or equal to 45°.

The angle between the second vector k2 and the horizontal direction X is less than or equal to 30°, and the angle between the third vector k3 and the horizontal direction X is less than or equal to 30°.

The angle between the second vector k2 and the horizontal direction X is equal to the angle between the third vector k3 and the horizontal direction X.

The in-coupling grating and the out-coupling grating are disposed at a same side of the waveguide substrate, or disposed at two opposite sides of the waveguide substrate, respectively.

The out-coupling grating and the waveguide substrate are integrally formed.

The AR display device further includes a polarizer. Light exited from the polarizer enters the out-coupling grating, and a polarization direction of the polarizer is parallel to the second vector k2 or the third vector k3, or between the second vector k2 and the third vector k3.

The out-coupling grating is a stereoscopic grating that is in a preset pattern in an XY plane and extends in a Z direction, where the preset pattern is any one of a circle, a T-shape, or a rhombus.

In a third aspect, a near-eye display device is provided in the disclosure. The near-eye display device the AR display device of any one of the first aspect or the second aspect.

The near-eye display device includes a wearable rim. The wearable rim has two window regions spaced apart from each other, and the out-coupling grating is disposed in at least one window region of the two window regions.

The near-eye display device further includes a wearable temple, an image source, and an optical lens assembly. The wearable temple is connected to the wearable rim. The image source is disposed at one side of the waveguide substrate and configured to generate light according to an image to-be-displayed. The optical lens assembly is disposed between the image source and the in-coupling grating and configured to project the light into the in-coupling grating according to a preset rule. At least one of the image source or the optical lens assembly is disposed at a connection position between the wearable rim and the wearable temple.

Technical solutions of implementations of the present disclosure will be described clearly and completely with reference to accompanying drawings in implementations of the present disclosure. Apparently, implementations described herein are merely some implementations, rather than all implementations, of the present disclosure. Based on implementations of the present disclosure, all other implementations obtained by those of ordinary skill in the art without creative effort shall fall within the protection scope of the present disclosure.

It should be noted that the term "embodiment" or "implementation" referred to herein means that a particular feature, structure, or characteristic described in conjunction with the embodiment or implementation may be contained in at least one implementation of the present disclosure. The phrase "implementation" appearing in various places in the specification does not necessarily refer to the same implementation, nor does it refer to an independent or alternative implementation that is mutually exclusive with other implementations. It is expressly and implicitly understood by those skilled in the art that implementations described herein may be combined with other implementations.

The terms "first" and "second" appearing in the present disclosure are only used for a purpose of description, and cannot be understood as indicating or implying relative importance or implicitly indicating the number of indicated technical features. Thus, the features defined by "first" and "second" may explicitly or implicitly include one or more of the features. In the description of the present disclosure, "multiple" means two or more than two, unless specified otherwise.

Figures 2, 3:
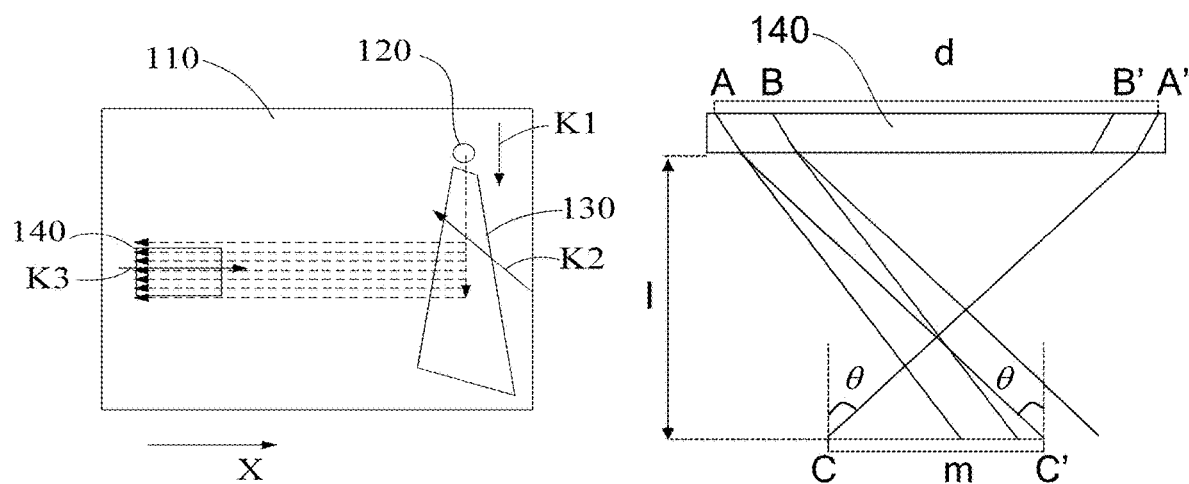
FIG. 2 is a schematic diagram illustrating light propagation of the AR display device illustrated in FIG. 1.
FIG. 3 is a schematic diagram illustrating an application scenario of an AR display device provided in an implementation of the disclosure.

Refer to FIG. 1 and FIG. 2 together, where FIG. 1 is a schematic diagram of an AR display device provided in an implementation of the disclosure, and FIG. 2 is a schematic diagram illustrating light propagation of the AR display device illustrated in FIG. 1. An AR display device 1 is provided in the disclosure. The AR display device 1 may be a pair of AR glasses, and may also be applied to a device with a windshield, such as a vehicle. The AR display device 1 is described in detail below. The AR display device 1 includes a waveguide substrate 110, an in-coupling grating 120, a turn grating 130, and an out-coupling grating 140. The in-coupling grating 120 is disposed on the waveguide substrate 110 and is configured to couple light into the waveguide substrate 110. A grating vector of the in-coupling grating 120 is a first vector K1. The turn grating 130 is disposed on the waveguide substrate 110 and is configured to perform pupil expansion on the light coupled into the waveguide substrate 110 by the in-coupling grating 120. A grating vector of the turn grating 130 is a second vector K2. The out-coupling grating 140 is disposed on the waveguide substrate 110. The out-coupling grating 140 is configured to receive the light that is subject to the pupil expansion by the turn grating 130 and couple the light out of the waveguide substrate 110. A grating vector of the out-coupling grating 140 is a third vector K3. The first vector K1, the second vector K2, and the third vector K3 form a closed vector triangle. An angle A between the third vector K3 and a horizontal direction X satisfies: $-45° \leq A \leq 45°$ when the AR display device 1 is used.

In FIG. 2, light is represented by a dotted line. When the AR display device 1 is used, the waveguide substrate 110 may be considered in an XY plane. The horizontal direction X is in the XY plane.

Some application scenarios of the AR display device 1 are described below. An important application scenario of the AR display device 1 of the disclosure is for weaken a rainbow effect generated by outdoor sunlight. When the AR display device 1 is a pair of AR glasses, the AR display device 1 is worn by a user. A scenario in which the AR display device 1 is used is described as follows. On condition that the AR display device 1 is a pair of AR glasses, when the user wears the AR display device 1 and stands outdoors, the angle A between the third vector K3 of the AR display device 1 of the disclosure and the horizontal direction X satisfies: $-45° \leq A \leq 45°$, which can weaken or even eliminate the rainbow effect generated by outdoor sunlight.

When the AR display device 1 is applied to a device with a windshield, such as a vehicle, the AR display device 1 may be disposed at one side of the windshield of the vehicle close to human eyes. The AR display device 1 may be directly attached to the windshield, or may not be directly attached to the windshield and is spaced apart from the windshield. Eyes of the user view through the AR display device the outside of the vehicle, for example, roads and pedestrians outside the vehicle. The angle A between the third vector K3 of the AR display device 1 of the disclosure and the horizontal direction X satisfies: $-45° \leq A \leq 45°$, which can weaken or even eliminate the rainbow effect generated by outdoor sunlight.

The waveguide substrate 110, also known as an optical waveguide substrate, a dielectric optical-waveguide-substrate, or a waveguide substrate plate, is a medium that guides light to propagate therein. The optical waveguide substrate generally includes two types. One type is an integrated optical-waveguide-substrate including a planar (thin-film) dielectric optical-waveguide-substrate and a strip-shaped dielectric optical-waveguide-substrate. The integrated optical-waveguide-substrate is usually part of a photoelectric integrated device (or system) and thus referred to as an integrated optical-waveguide-substrate. The other type is a cylindrical optical-waveguide-substrate, commonly known as an optical fiber. In general, the waveguide substrate 110 is a guided structure for transmission of light (optical-frequency electromagnetic wave) and consists of a light-transmissive medium (such as a quartz glass). When light is transmitted in the waveguide substrate 110, total reflection occurs in the optical waveguide substrate 110, so that the light is limited to be propagated in the waveguide substrate 110.

The waveguide substrate 110 in the disclosure is also referred to as a diffractive waveguide substrate. The waveguide substrate 110 has advantages such as a light weight, a thin thickness, a high transmission property for external light, a good color reducibility, and a large field of vision (FOV), and thus is considered as a must-choice in optical solutions for consumer-grade AR glasses.

The waveguide substrate 110 has an outer surface 111 (see FIG. 22) and an inner surface 112 (see FIG. 22) opposite the outer surface 111. The outer surface 111 refers to a surface away from a user when the AR display device 1 is used. The inner surface 112 refers to a surface close to the user when the AR display device 1 is used.

The in-coupling grating 120 is disposed on the waveguide substrate 110 as follows. The in-coupling grating 120 is disposed on the inner surface 112 or the outer surface 111 of the waveguide substrate 110. A process of coupling the light into the waveguide substrate 110 by the in-coupling grating 120 is referred to as couple-in.

The pupil expansion refers to a phenomenon as follows. On condition that light is transmitted in the waveguide substrate 110, part of the light is deflected under the action of the turn grating 130, while another part of the light is propagated in an original propagation direction, the light propagated in the original propagation direction is deflected many times under multiple actions of the turn grating 130, and thus multiple deflected light are generated.

In this implementation, the first vector K1, the second vector K2, and the third vector K3 form the closed vector triangle to ensure that the AR display device 1 can form an image.

The angle A between the third vector K3 and the horizontal direction X satisfies: $-45° \leq A \leq 45°$, which can weaken or even eliminate the rainbow effect. That the angle A between the third vector K3 and the horizontal direction X satisfying: $-45° \leq A \leq 45°$ can weaken or even eliminate the rainbow effect will be described and explained later with reference to data.

As for AR, light of an image to-be-displayed generated by an image source 180 in the AR display device 1 enters the waveguide substrate 110 through the in-coupling grating 120, is coupled out through the out-coupling grating 140, and exits human eyes, and external ambient light (for example, outdoor sunlight and light generated by indoor lighting lamps) may also enter the human eyes through the in-coupling grating 120. Therefore, the user may view an image in the image source 180 as well as an image of the external environment, thereby implementing an AR function that combines virtuality and reality. However, because the in-coupling grating 120 and the out-coupling grating 140 each have a strong dispersion function, the external ambient light may be dispersed into a rainbow pattern by the out-coupling grating 140, where the rainbow pattern is mainly generated through −1st order reflection and −1st order transmission. When the user uses the AR display device 1, for example, wears the AR display device 1, −1st order reflected light cannot enter human eyes directly and thus has no impact on use experience of the user, while −1st order transmitted light may enter human eyes, such that the user can see a rainbow pattern, where this phenomenon is called a rainbow effect. When the user sees the rainbow pattern, the use experience of the user may be affected at the very least, and the eyes of the user may be hurt in severe cases. It should be noted that, whether a rainbow pattern formed through −1st order transmission is able to enter the eyes of the user wearing the AR display device 1 is related to an incident angle of the external ambient light. For example, on condition that the external ambient light is incident on the out-coupling grating 140 at 50°, the rainbow pattern formed through −1st order transmission may have a relatively large exit angle, diffracted light is more likely to deviate from an observation position of the eyes of the user. Even if the diffracted light enters the eyes of the user, the rainbow pattern may appear in a relatively outer region of a field of view because a diffraction angle is relatively large. When the external ambient light is incident on the in-coupling grating 120 at 80° C., a rainbow pattern formed through −1st order transmission may have a relatively small exit angle, and diffracted light is more likely to enter the human eyes and is closer to a central position of the field of view, thereby resulting in a great impact on the user.

When the user uses the AR display device 1 outdoors, outdoor sunlight as external ambient light generally forms a bright and dazzling rainbow pattern through the out-coupling grating 140, which directly results in that the existing AR display device 1 on the market cannot be well used outdoors or even is unable to be used outdoors. In the disclosure, a principle of superposition of a sunlight incident vector and a vector is mainly used to convert −1st order transmitted light into an evanescent wave or make the light deviate from an eye movement range of the user, thereby alleviating the rainbow pattern. It can be understood that, although sunlight is taken as an example of the external ambient light for illustration in the disclosure, in other implementations, the external ambient light further includes light generated by a lighting lamp or the like.

In addition, a grating equation is as follows:

$$\theta_{diffraction} = \sin^{-1}(\sin(\theta_{incidence}) - \lambda/d) \qquad \text{(formula 1)},$$

where $\lambda$ represents a wavelength, and d represents a grating interval. It can be seen from the grating equation of formula (1) that the longer a wavelength of light is, the larger a diffraction angle is. Since a wavelength of blue light is less than that of red light, a diffraction angle of the blue light is less than that of the red light. For this reason, in the case where a rainbow pattern appears, the blue light appears at a center of a field of view observed by the eyes of the user due to a relatively small diffraction angle, and the red light appears at a peripheral region of the field of view due to a relatively large diffraction angle.

Refer to FIG. 3, where FIG. 3 is a schematic diagram illustrating an application scenario of an AR display device provided in an implementation of the disclosure. The following will determine whether a rainbow pattern can enter human eyes. As illustrated in the schematic diagram, AA' represents an outermost region of the out-coupling grating 140, a length of AA' is set to d, and BB' represents an inner region of the out-coupling grating 140. When the AR display device 1 is worn, a distance from the waveguide substrate 110 to the eye movement range is referred to as an eye viewing distance, and a length of the eye viewing distance is defined as 1. The eye movement range refers to an observation region where human eyes can see a complete and clear field of view only when the human eyes are in this observation region. A geometric center of the eye movement range is aligned with a geometric center of the out-coupling grating 140 by default, and a length of the eye movement range is defined as m. Assuming that a beam of light is incident from point A and diffracted by the out-coupling grating 140 to an edge C' of the eye movement range and an angle between the diffracted light and a normal line is θ, a formula can be obtained according to a geometric relationship:

$$\theta = \tan^{-1}\left(\frac{l}{(d+m)/2}\right). \quad \text{(formula 2)}$$

It can be easily seen from FIG. 3 that, on condition that a diffraction angle of the light is greater than θ, the light cannot be observed by human due to exiting beyond the diffraction range, and on condition that the diffraction angle of the light is less than θ, the light can be captured by the human eyes due to exiting into the eye movement range. In conclusion, on condition that θ is increasingly small, less rainbow pattern enters the human eyes, and thus the rainbow pattern has less impact on the user experience. When θ is increasingly large, the rainbow effect will be more obvious. That is to say, on the basis of keeping the eye movement range and the eye viewing distance unchanged, on condition that a region of the out-coupling grating 140 is smaller or an interval of the out-coupling grating 140 is smaller, the impact of the rainbow pattern will be weaker. Finally, a relationship among FOV, a size d of the out-coupling grating 140, and a size m of the eye movement range can be deduced as follows according to a geometric relationship:

$$d=m+l*\tan(FOV/2)*2 \quad \text{(formula 3)}.$$

Figure 4:
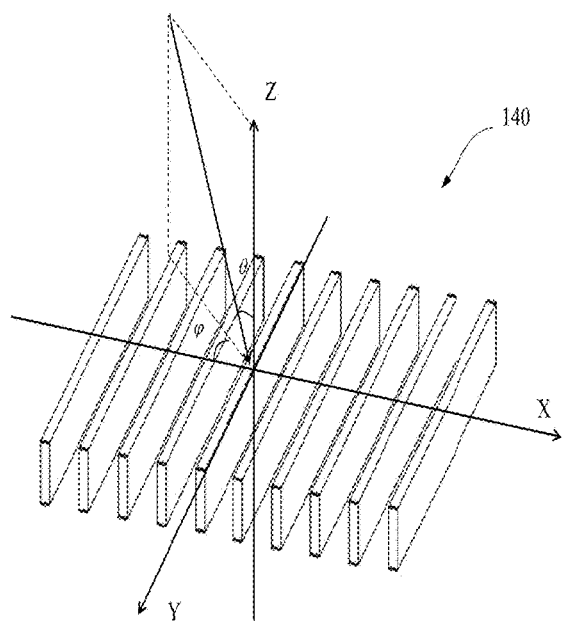
FIG. 4 is a schematic diagram illustrating an out-coupling grating and various parameters in the disclosure.

Before explaining the technical principle of the disclosure in depth, several common variables in grating diffraction are explained first. Refer to FIG. 4, where FIG. 4 is a schematic diagram illustrating an out-coupling grating and various parameters in the disclosure. As illustrated in the schematic diagram of the implementation, a direction of a grating vector K3 of the out-coupling grating 140 is the same with a positive direction of an X axis, an angle φ between a plane defined by a sunlight incident direction and a Z axis and the X axis is referred to as an azimuth angle, and an angle θ between the sunlight incident direction and the Z axis is referred to as an incident angle.

Figure 5:
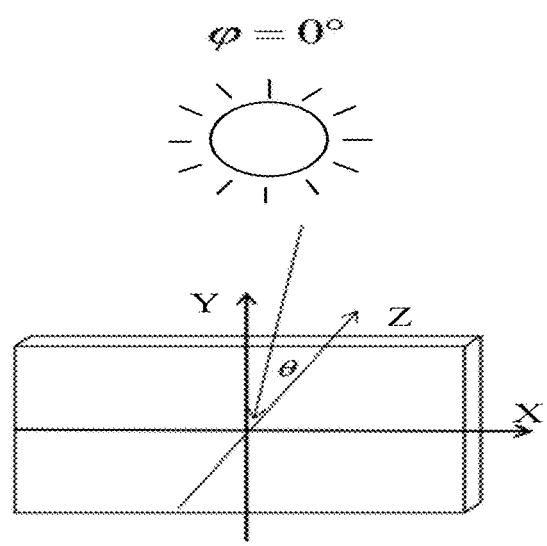
FIG. 5 is a schematic diagram illustrating a waveguide substrate facing the sun on condition that a grating vector is arranged vertically.
Figure 6:
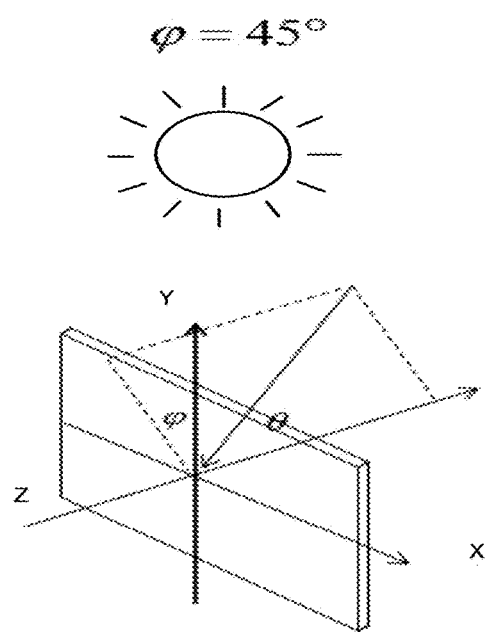
FIG. 6 is a schematic diagram illustrating a waveguide substrate inclined at 45° towards the sun on condition that a grating vector is arranged vertically.
Figure 7:
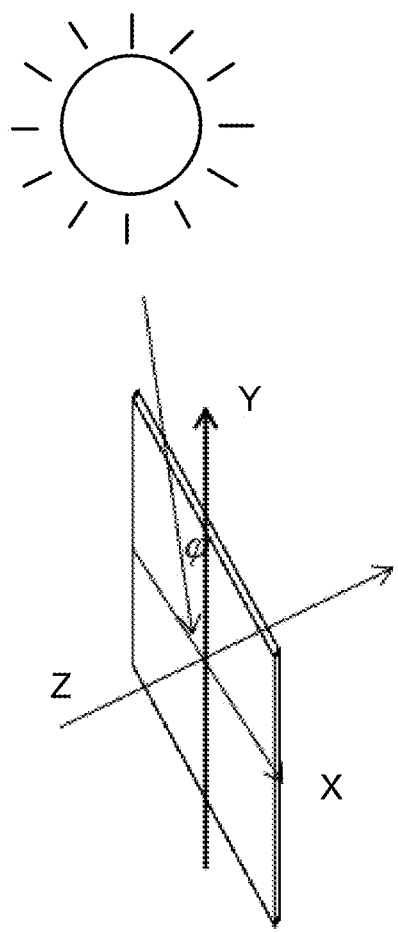
FIG. 7 is a schematic diagram illustrating a waveguide substrate completely sideways to the sun on condition that a grating vector is arranged vertically.

When the grating vector of the out-coupling grating 140 is in a vertical direction (namely, the direction of the grating vector is parallel to a Y direction), sunlight irradiating the AR display device 1 is illustrated in FIGS. 5 to 7. The following discusses an incident angle θ of the sunlight relative to the out-coupling grating 140 and an azimuth angle φ in three cases where the waveguide substrate 110 faces the sun at different angles, with reference to FIGS. 5 to 7. It should be noted that, a specific structure of the out-coupling grating 140 is not illustrated in FIGS. 5 to 7.

FIG. 5 (namely, case 1) illustrates a situation where the waveguide substrate 110 faces the sun, that is, the sunlight is in an XZ plane. In this case, the azimuth angle φ is equal to 0°, and the incident angle θ of the sunlight relative to the out-coupling grating 140 is equal to a solar elevation angle.

FIG. 6 (namely, case 2) illustrates a situation where the waveguide substrate 110 is inclined at 45° towards the sun, that is, an angle between a plane formed by the sunlight and a normal direction (Z axis) of the waveguide substrate 110 and the X axis is 45°, and thus the azimuth angle φ is equal to 45°. The incident angle θ of the sunlight relative to the out-coupling grating 140 is equal to the solar elevation angle.

FIG. 7 (case 3) illustrates a situation where the waveguide substrate 110 is completely sideways to the sun, that is, the sunlight is in an XY plane. In this case, the azimuth angle φ satisfies: φ=90°-solar elevation angle, and the incident angle θ of the sunlight relative to the out-coupling grating 140 is equal to 90°.

Figure 8:
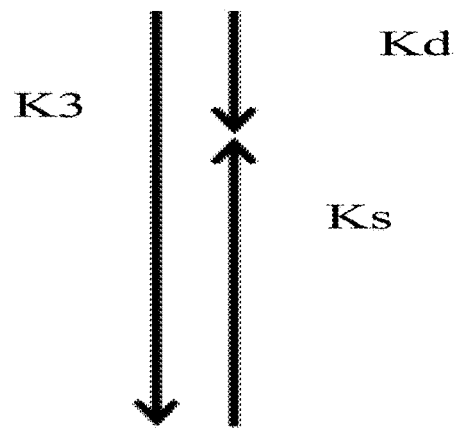
FIG. 8 is a schematic diagram illustrating superposition of vectors in FIG. 5.
Figure 9:
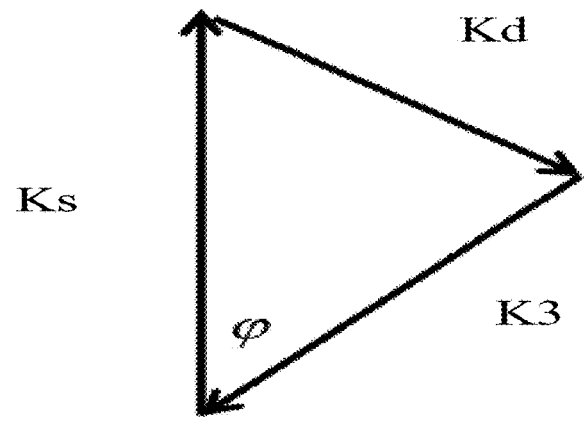
FIG. 9 is a schematic diagram illustrating superposition of vectors in FIG. 6.
Figure 10:
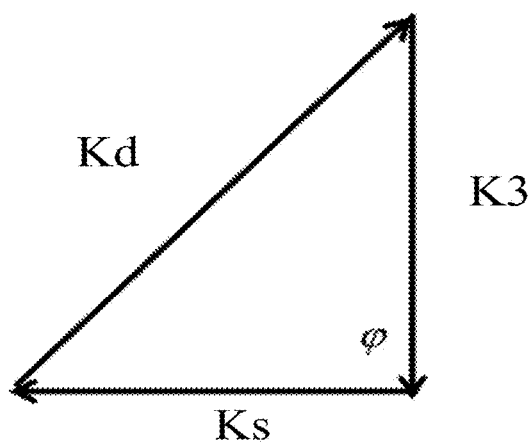
FIG. 10 is a schematic diagram illustrating superposition of vectors in FIG. 7.

Refer to FIGS. 8 to 10 together, where FIG. 8 is a schematic diagram illustrating superposition of vectors in FIG. 5, FIG. 9 is a schematic diagram illustrating superposition of vectors in FIG. 6, and FIG. 10 is a schematic diagram illustrating superposition of vectors in FIG. 7. It should be noted that vectors in FIGS. 8 to 10 are superimposed in a k domain, where Ks is an incident vector of sunlight, K3 is the grating vector of the out-coupling grating, and Kd is an exit vector of the sunlight. When an incident angle or a diffraction angle of the sunlight is increasingly large, a module of the incident vector Ks of the sunlight will be increasingly large. When the module of the exit vector Kd is relatively large, the exit angle of the sunlight will also be relatively large, and a rainbow pattern generated through diffraction is more likely to deviate from the eye movement range. When the module of the exit vector Kd is relatively small, the rainbow pattern generated through diffraction is more likely to appear in the eye movement range and the center of the field of view. That is to say, an impact of the rainbow pattern may be more obvious on condition that the exit vector Kd is longer, and the impact of the rainbow pattern may be weaker on condition that the exit vector Kd is shorter. Vector superposition in three cases is analyzed in detail below.

In case 1, since the azimuth angle φ is 0°, i.e., the incident vector Ks of the sunlight is parallel to the grating vector K3 (namely, the third vector K3) of the out-coupling grating, in this case, the exit vector Kd of the sunlight is the shortest, and the rainbow pattern is most likely to be generated.

In case 2, the azimuth angle φ is 45°, the exit vector Kd of the sunlight is longer than that in case 1, and thus the impact of the rainbow pattern will be weakened.

In case 3, the azimuth angle φ is relatively large, so the impact of the rainbow pattern will be further weakened.

According to calculation, we can obtain a calculation relationship between the module of the exit vector and the azimuth angle as follows:

$$|\vec{Kd}| = \sqrt{|\vec{K3}|^2 + |\vec{Ks}|^2 - 2*|\vec{K3}|*|\vec{Kd}|*\cos(\varphi)}. \quad \text{(formula 4)}$$

As can be seen from the formula (4), the AR display device 1 hardly generates a rainbow pattern on condition that the azimuth angle φ is closer to 90°.

The following will perform detailed calculation in the case where the grating vector of the out-coupling grating 140 is arranged vertically. First, according to formula (2), it can be obtained through calculation that on condition that −1st order transmitted light through the out-coupling grating 140 has a diffraction angle greater than 40°, the −1st order transmitted light will deviate from the eye movement range and cannot be captured by human eyes. An interval of the out-coupling grating 140 is set to 380 nm, and light with a wavelength of 460 nm (blue light), light with a wavelength of 522 nm (green light), and light with a wavelength of 620 nm (red light) in the diffracted light are analyzed in diffraction angles. For case 1, calculation results are illustrated as follows in the case where an incident azimuth angle of sunlight is 0°.

TABLE 1

| | interval of the out-coupling grating 140 is 380 nm | | |
|---|---|---|---|
| wavelength solar elevation angle | 620.0 (red light) diffraction angle | 522.0 (green light) diffraction angle | 460.0 (blue light) diffraction angle |
| 0.0 | 90.0 | 90.0 | 90.0 |
| 5.0 | 90.0 | 90.0 | 90.0 |
| 10.0 | 90.0 | 90.0 | 90.0 |
| 15.0 | 90.0 | 90.0 | 72.1 |
| 20.0 | 90.0 | 90.0 | 60.3 |
| 25.0 | 90.0 | 72.0 | 52.0 |
| 30.0 | 90.0 | 60.9 | 45.3 |
| 35.0 | 90.0 | 53.1 | 39.6 |
| 40.0 | 81.4 | 47.0 | 34.6 |
| 45.0 | 67.6 | 41.8 | 30.2 |
| 50.0 | 59.9 | 37.4 | 26.4 |
| 55.0 | 54.3 | 33.7 | 23.0 |
| 60.0 | 50.0 | 30.5 | 20.2 |
| 65.0 | 46.5 | 27.9 | 17.7 |
| 70.0 | 43.8 | 25.7 | 15.7 |
| 75.0 | 41.7 | 24.1 | 14.2 |
| 80.0 | 40.3 | 22.9 | 13.0 |
| 85.0 | 39.4 | 22.2 | 12.4 |
| 90.0 | 39.2 | 21.9 | 12.2 |

Table 1 illustrates the diffraction angles of the blue light, the diffraction angles of the green light, and the diffraction angles of the red light on condition that the sunlight is incident at different incident angles and the azimuth angle of the sunlight is 0°. It can be seen from table 1 that on condition that the solar elevation angle is greater than 35°, human can see blue diffracted light (namely, the blue light). When the solar elevation angle is greater than 50°, human can see green diffracted light (namely, the green light). When the solar elevation angle is greater than 85°, human can see red diffracted light (namely, the red light). That is to say, as the diffraction angle gradually increases, the green light and the red light also gradually appear, and the blue light becomes closer to the center of the field of view. It is easy to see from table 1 that as the incident angle increases, the rainbow pattern becomes more obvious.

For case 2, the calculation results are illustrated in table 2 in the case where the incident azimuth angle φ of the sunlight is 45°.

TABLE 2

| | interval of the out-coupling grating is 380 nm | | |
|---|---|---|---|
| wavelength solar elevation angle | 620.0 (red light) diffraction angle | 522.0 (green light) diffraction angle | 460.0 (blue light) diffraction angle |
| 0.0 | 90.0 | 90.0 | 90.0 |
| 5.0 | 90.0 | 90.0 | 90.0 |
| 10.0 | 90.0 | 90.0 | 90.0 |
| 15.0 | 90.0 | 90.0 | 90.0 |
| 20.0 | 90.0 | 90.0 | 86.8 |
| 25.0 | 90.0 | 90.0 | 73.6 |
| 30.0 | 90.0 | 90.0 | 68.0 |
| 35.0 | 90.0 | 90.0 | 64.3 |
| 40.0 | 90.0 | 90.0 | 61.9 |
| 45.0 | 90.0 | 90.0 | 60.3 |
| 50.0 | 90.0 | 83.1 | 59.4 |
| 55.0 | 90.0 | 79.5 | 59.0 |
| 60.0 | 90.0 | 77.7 | 58.9 |
| 65.0 | 90.0 | 76.8 | 59.0 |
| 70.0 | 90.0 | 76.4 | 59.3 |
| 75.0 | 90.0 | 76.3 | 59.7 |
| 80.0 | 90.0 | 76.3 | 60.0 |
| 85.0 | 90.0 | 76.3 | 60.2 |
| 90.0 | 90.0 | 76.4 | 60.2 |

Table 2 illustrates the diffraction angles of the blue light, the diffraction angles of the green light, and the diffraction angles of the red light on condition that the sunlight is incident at different incident angles and the azimuth angle of the sunlight is 45°. It can be seen from the calculation results that in this case, human is unable to observe the rainbow pattern.

For case 3, the calculation results are illustrated in table 3 in the case where the incident azimuth angle φ of the sunlight satisfies: φ=90°-solar elevation angle.

TABLE 3

| | interval of the out-coupling grating is 380 nm | | |
|---|---|---|---|
| wavelength solar elevation angle | 620.0 (red light) diffraction angle | 522.0 (green light) diffraction angle | 460.0 (blue light) diffraction angle |
| 0.0 | 90.0 | 90.0 | 90.0 |
| 5.0 | 90.0 | 90.0 | 90.0 |
| 10.0 | 90.0 | 90.0 | 90.0 |
| 15.0 | 90.0 | 90.0 | 72.1 |
| 20.0 | 90.0 | 90.0 | 60.3 |
| 25.0 | 90.0 | 72.0 | 52.0 |
| 30.0 | 90.0 | 60.9 | 45.3 |
| 35.0 | 90.0 | 53.1 | 39.6 |
| 40.0 | 81.4 | 47.0 | 34.6 |
| 45.0 | 67.6 | 41.8 | 30.2 |
| 50.0 | 59.9 | 37.4 | 26.4 |
| 55.0 | 54.3 | 33.7 | 23.0 |
| 60.0 | 50.0 | 30.5 | 20.2 |
| 65.0 | 46.5 | 27.9 | 17.7 |
| 70.0 | 43.8 | 25.7 | 15.7 |
| 75.0 | 41.7 | 24.1 | 14.2 |
| 80.0 | 40.3 | 22.9 | 13.0 |
| 85.0 | 39.4 | 22.2 | 12.4 |
| 90.0 | 39.2 | 21.9 | 12.2 |

As can be seen from the calculation results in table 3, the calculation results of the rainbow pattern in case 3 are the same as those in case 1. When the solar elevation angle is greater than 35°, human can see blue diffracted light (namely, the blue light). When the solar elevation angle is greater than 50°, human can see green diffracted light (namely, the green light). When the solar elevation angle is greater than 85°, human can see red diffracted light (namely, the red light). That is to say, as the diffraction angle gradually increases, the green light and the red light also gradually appear, and the blue light becomes closer to the center of the field of view. It is easy to see from table 3 that, as the incident angle increases, the rainbow pattern becomes more obvious.

Figure 11:
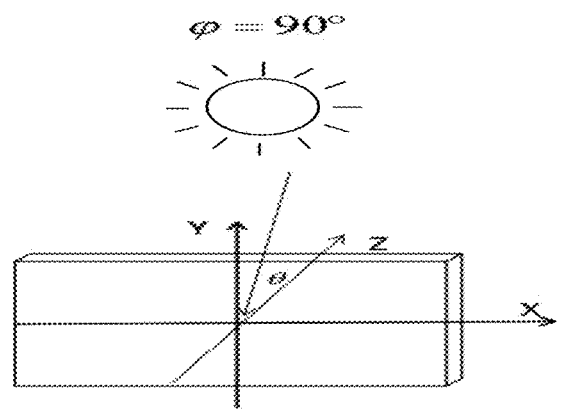
FIG. 11 is a schematic diagram illustrating a waveguide substrate facing the sun on condition that a grating vector is arranged horizontally.
Figure 12:
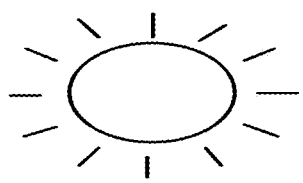
FIG. 12 is a schematic diagram illustrating a waveguide substrate inclined at 45° towards facing the sun on condition that a grating vector is arranged horizontally.
Figure 12:
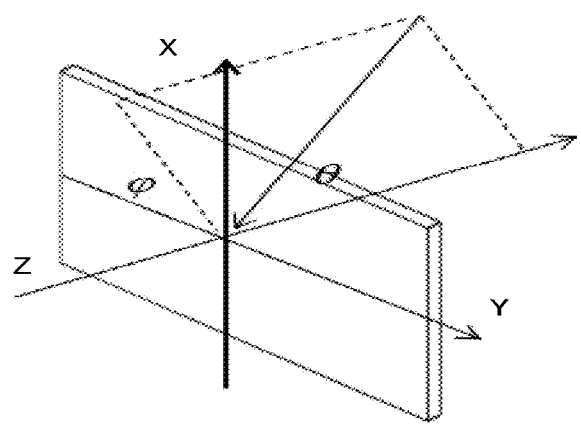
Figure 13:
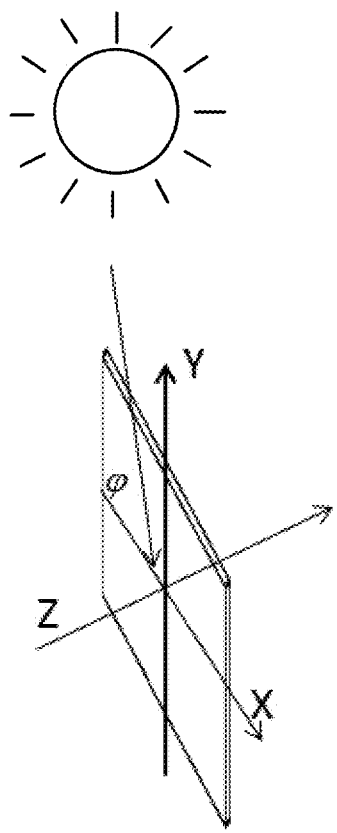
FIG. 13 is a schematic diagram illustrating a waveguide substrate completely sideways to the sun on condition that a grating vectors is arranged horizontally.

The following introduces a situation where the grating vector is in the horizontal direction (the direction of the grating vector is parallel to an X direction). When the grating vector is in the horizontal direction, sunlight irradiating the AR display device 1 is illustrated in FIGS. 11 to 13. The following discusses an incident angle θ of the sunlight relative to the out-coupling grating 140 and an azimuth angle φ in three cases where the waveguide substrate 110 faces the sun at different angles, with reference to FIGS. 11 to 13.

FIG. 11 (namely, case 1') illustrates a situation where the waveguide substrate 110 faces the sun, that is, the sunlight is in the XZ plane. In this case, the azimuth φ is equal to 90°, and the incident angle θ of the sunlight relative to the out-coupling grating 140 is equal to the solar elevation angle.

FIG. 12 (namely, case 2') illustrates a situation where the waveguide substrate 110 is inclined at 45° towards the sun, that is, an angle between a plane formed by the sunlight and the normal direction (Z axis) of the waveguide substrate 110 and the X axis is 45°, and thus the azimuth angle φ is equal to 45°. The incident angle θ of the sunlight relative to the out-coupling grating 140 is equal to the solar elevation angle.

FIG. 13 (namely, case 3') illustrates a situation where the waveguide substrate 110 is completely sideways to the sun, that is, the sunlight is in the XY plane. In this case, the azimuth angle φ is equal to the solar elevation angle, and the incident angle θ of the sunlight relative to the out-coupling grating 140 is equal to 90°.

Figure 14:
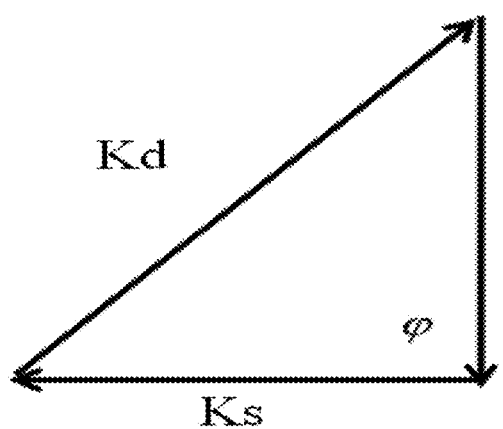
FIG. 14 is a schematic diagram illustrating superposition of vectors in FIG. 11.
Figure 15:
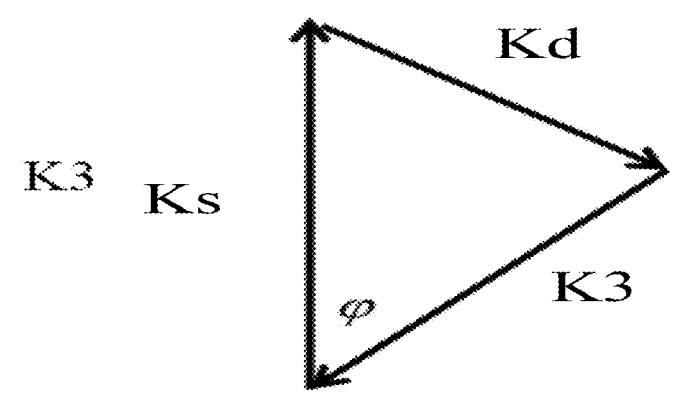
FIG. 15 is a schematic diagram illustrating superposition of vectors in FIG. 12.

Refer to FIGS. 14 to 16 together, where FIG. 14 is a schematic diagram illustrating superposition of vectors in FIG. 11, FIG. 15 is a schematic diagram illustrating superposition of vectors in FIG. 12, and FIG. 16 is a schematic diagram illustrating superposition of vectors in FIG. 13. It should be noted that vectors in FIGS. 14 to 16 are superimposed in a k domain, where Ks is an incident vector of sunlight, K3 is the grating vector of the out-coupling grating, and Kd is an exit vector of the sunlight. When an incident angle or a diffraction angle of the sunlight is increasingly large, a module of the incident vector Ks of the sunlight will be increasingly large. When the module of the exit vector Kd is relatively large, the exit angle of the sunlight will also be relatively large, and a rainbow pattern generated through diffraction is more likely to deviate from the eye movement range. When the module of the exit vector Kd is relatively small, the rainbow pattern generated through diffraction is more likely to appear in the eye movement range, and more likely to appear in the center of the field of view. That is to say, an impact of the rainbow pattern may be more obvious on condition that the exit vector Kd is longer, and the impact of the rainbow pattern may be weaker on condition that the exit vector Kd is shorter. Vector superposition in three cases is analyzed in detail below.

In case 1', since the azimuth angle φ is 90°, i.e., the incident vector Ks of the sunlight is perpendicular to the grating vector K3 (namely, the third vector K3) of the out-coupling grating, in this case, the exit vector Kd of the sunlight is the longest, and the rainbow pattern is least likely to be generated.

In case 2', the azimuth angle φ is 45°, the exit vector Kd of the sunlight is longer than that in case 1', and thus the impact of the rainbow pattern will be weakened.

In case 3', the azimuth angle φ is related to the solar elevation angle. As the solar elevation angle is increasingly large, the rainbow pattern is increasingly weak, and thus the impact of the rainbow pattern will be further weakened.

The following will perform detailed calculation in the case where the grating vector is arranged horizontally. According to formula (2), it can be obtained through calculation that on condition that −1st order transmitted light through the out-coupling grating 140 has a diffraction angle greater than 40°, the −1st order transmitted light will deviate from the eye movement range and cannot be captured by human eyes. An interval of the out-coupling grating 140 is set to 380 nm, and light with a wavelength of 460 nm (blue light), light with a wavelength of 522 nm (green light), and light with a wavelength of 620 nm (red light) in the diffracted light are analyzed in diffraction angles. For case 1', calculation results are illustrated as follows in the case where the incident azimuth angle of sunlight is 90°.

TABLE 1'

| | interval of the out-coupling grating is 380 nm | | |
|---|---|---|---|
| wavelength solar elevation angle | 620.0 (red light) diffraction angle | 522.0 (green light) diffraction angle | 460.0 (blue light) diffraction angle |
| 0.0 | 90.0 | 90.0 | 90.0 |
| 5.0 | 90.0 | 90.0 | 90.0 |
| 10.0 | 90.0 | 90.0 | 90.0 |
| 15.0 | 90.0 | 90.0 | 90.0 |
| 20.0 | 90.0 | 90.0 | 90.0 |
| 25.0 | 90.0 | 90.0 | 90.0 |
| 30.0 | 90.0 | 90.0 | 90.0 |
| 35.0 | 90.0 | 90.0 | 90.0 |
| 40.0 | 90.0 | 90.0 | 90.0 |
| 45.0 | 90.0 | 90.0 | 90.0 |
| 50.0 | 90.0 | 90.0 | 90.0 |
| 55.0 | 90.0 | 90.0 | 90.0 |
| 60.0 | 90.0 | 90.0 | 90.0 |
| 65.0 | 90.0 | 90.0 | 90.0 |
| 70.0 | 90.0 | 90.0 | 90.0 |
| 75.0 | 90.0 | 90.0 | 90.0 |
| 80.0 | 90.0 | 90.0 | 90.0 |
| 85.0 | 90.0 | 90.0 | 90.0 |
| 90.0 | 90.0 | 90.0 | 60.2 |

Table 1' illustrates the diffraction angles of the blue light, the diffraction angles of the green light, and the diffraction angles of the red light on condition that the sunlight is incident at different incident angles and the azimuth angle of the sunlight is 90°. It can be seen from table 1' that, in this case, human is unable to observe the rainbow pattern.

For case 2', the calculation results are illustrated in table 2' in the case where the incident azimuth angle φ of the sunlight is 45°.

TABLE 2'

| | interval of the out-coupling grating is 380 nm | | |
|---|---|---|---|
| wavelength<br>solar elevation<br>angle | 620.0<br>(red light)<br>diffraction<br>angle | 522.0<br>(green light)<br>diffraction<br>angle | 460.0<br>(blue light)<br>diffraction<br>angle |
| 0.0 | 90.0 | 90.0 | 90.0 |
| 5.0 | 90.0 | 90.0 | 90.0 |
| 10.0 | 90.0 | 90.0 | 90.0 |
| 15.0 | 90.0 | 90.0 | 90.0 |
| 20.0 | 90.0 | 90.0 | 86.8 |
| 25.0 | 90.0 | 90.0 | 73.6 |
| 30.0 | 90.0 | 90.0 | 68.0 |
| 35.0 | 90.0 | 90.0 | 64.3 |
| 40.0 | 90.0 | 90.0 | 61.9 |
| 45.0 | 90.0 | 90.0 | 60.3 |
| 50.0 | 90.0 | 83.1 | 59.4 |
| 55.0 | 90.0 | 79.5 | 59.0 |
| 60.0 | 90.0 | 77.7 | 58.9 |
| 65.0 | 90.0 | 76.8 | 59.0 |
| 70.0 | 90.0 | 76.4 | 59.3 |
| 75.0 | 90.0 | 76.3 | 59.7 |
| 80.0 | 90.0 | 76.3 | 60.0 |
| 85.0 | 90.0 | 76.3 | 60.2 |
| 90.0 | 90.0 | 76.4 | 60.2 |

Table 2' illustrates the diffraction angles of the blue light, the diffraction angles of the green light, and the diffraction angles of the red light on condition that the sunlight is incident at different incident angles and the azimuth angle of the sunlight is 45°. It can be seen from the calculation results that, in this case, human is unable to observe the rainbow pattern.

For case 3', the calculation results are illustrated in table 3' in the case where the incident azimuth angle φ of the sunlight is equal to the solar elevation angle.

TABLE 3'

| | interval of the out-coupling grating is 380 nm | | |
|---|---|---|---|
| wavelength<br>solar elevation angle | 620.0<br>(red light)<br>diffraction angle | 522.0<br>(green light)<br>diffraction angle | 460.0<br>(blue light)<br>diffraction angle |
| 0.0 | 39.2 | 21.9 | 12.2 |
| 5.0 | 39.9 | 22.8 | 13.4 |
| 10.0 | 42.0 | 25.2 | 16.5 |
| 15.0 | 45.6 | 28.9 | 20.9 |
| 20.0 | 50.5 | 33.5 | 25.9 |
| 25.0 | 57.1 | 39.1 | 31.4 |
| 30.0 | 66.1 | 45.4 | 37.4 |
| 35.0 | 84.0 | 52.9 | 44.0 |
| 40.0 | 90.0 | 62.2 | 51.4 |
| 45.0 | 90.0 | 76.4 | 60.2 |
| 50.0 | 90.0 | 90.0 | 72.5 |
| 55.0 | 90.0 | 90.0 | 90.0 |
| 60.0 | 90.0 | 90.0 | 90.0 |
| 65.0 | 90.0 | 90.0 | 90.0 |
| 70.0 | 90.0 | 90.0 | 90.0 |
| 75.0 | 90.0 | 90.0 | 90.0 |
| 80.0 | 90.0 | 90.0 | 90.0 |
| 85.0 | 90.0 | 90.0 | 90.0 |
| 90.0 | 90.0 | 90.0 | 90.0 |

From the calculation results in table 3', we can see that in case 3', the rainbow pattern can be observed by human only when the solar elevation angle is less than 30°. Specifically, when the solar elevation angle is less than 30°, human can see blue diffracted light (namely, the blue light). When the solar elevation angle is less than 25°, human can see green diffracted light (namely, the green light). When the solar elevation angle is less than 5°, human can see red diffracted light (namely, the red light).

Table 4 summarizes appearance of the rainbow pattern in the three cases where the grating vector is arranged horizontally and in the three cases where the grating vector is arranged vertically.

TABLE 4

| | case 1 or case 1' | case 2 or case 2' | case 3 or case 3' |
|---|---|---|---|
| grating vector<br>(arranged<br>vertically) | rainbow pattern<br>can be saw<br>when the solar<br>elevation angle<br>is greater<br>than 35°<br>(case 1) | rainbow pattern<br>cannot be saw<br>(case 2) | rainbow pattern<br>can be<br>saw when<br>the solar<br>elevation angle<br>is greater<br>than 35° (case 3) |
| grating vector<br>(arranged<br>horizontally) | rainbow pattern<br>cannot be<br>saw (case 1') | rainbow pattern<br>cannot be saw<br>(case 2') | rainbow<br>pattern can be<br>saw when the solar<br>elevation angle is less<br>than 30° (case 3') |

In consideration of the fact that in daily life, a case where the height angle is less than 30° usually occurs in the early morning or toward evening, but in consideration of the fact that the brightness of the sunlight is relatively low at this time, the impact of the rainbow pattern brought by the sunlight is also relatively weak. In midday, the solar elevation angle is relatively large and the brightness of the sunlight is relatively high, and thus the grating vector being arranged horizontally can effectively alleviate the impact caused by the rainbow pattern.

It can be seen from the above analysis that, the rainbow pattern generated during outdoor use of the AR display device 1 can be obviously alleviated by optimizing the arrangement direction of the grating vector (namely, the third vector K3) of the out-coupling grating 140. When the grating vector of the out-coupling grating 140 is arranged horizontally (namely, the angle between the third vector K3 of the out-coupling grating and the horizontal direction X is 0°), the effect of alleviating the rainbow pattern is the best. Even if the grating vector is arranged at an angle of ±45°, the impact of the rainbow pattern on the out-coupling grating 140 is much less than the impact of the rainbow pattern on the out-coupling grating 140 on condition that the grating vector is arranged vertically. In other words, the angle A between the direction of the grating vector K3 of the out-coupling grating 140 and the horizontal direction X satisfies: $-45° \leq A \leq 45°$.

In implementations of the disclosure, the −1st order transmitted light through the out-coupling grating 140 deviates from the eye movement range as far as possible through a formation mechanism of the rainbow pattern and a smart design, thereby alleviating the rainbow pattern. With implementations of the disclosure, complexity of the process may not be increased, and observation of ambient light by human eyes may not be affected. With the principle of light vector superposition, the rainbow pattern becomes an evanescent wave or deviates from the eye movement range as far as possible, thereby alleviating the rainbow pattern that enters human eyes of a user using the AR display device.

In an implementation, the angle A between the direction of the third vector K3 and the horizontal direction X satisfies: $-30° \leq A \leq 30°$. When the angle A between the direction of the third vector K3 and the horizontal direction X satisfies: $-30° \leq A \leq 30°$, even in the morning or toward evening, the rainbow pattern hardly appears. Therefore, on condition that the angle A between the direction of the third vector K3 and the horizontal direction X satisfies:

−30°≤A≤30°, the −1st order transmitted light through the out-coupling grating 140 can deviate from the eye movement range more effectively, thereby alleviating the rainbow pattern more effectively.

It should be noted that, in practical applications, selection of the range of the angle A between the third vector K3 and the horizontal direction X takes account of alleviating the rainbow pattern, imaging factors of the AR display device, and the like.

Refer to FIG. 17 and FIG. 18, where FIG. 17 is a schematic diagram of an AR display device provided in an implementation of the disclosure, and FIG. 18 is a schematic diagram illustrating light propagation of the AR display device illustrated in FIG. 17.

FIG. 17 illustrates a waveguide architecture consisting of the in-coupling grating, the turn grating, the out-coupling grating, and the waveguide substrate on condition that a vector of the out-coupling grating is arranged horizontally (namely, arranged in the X direction). An appearance of the in-coupling grating may be any one of a blazed grating, a slanted grating, a binary grating, or a photonic crystal. An appearance of the turn grating may be a binary grating or a photonic crystal. An appearance of the out-coupling grating may be any one of a blazed grating, a slanted grating, a binary grating, or a photonic crystal. On condition that a vector (namely, a first vector) K1 of the in-coupling grating is distributed in the vertical direction, and an angle $\varphi$ between a vector (namely, a second vector) K2 of the turn grating and the vertical direction is equal to 45°, a vector (namely, a third vector) K3 of the out-coupling grating parallel to the horizontal direction can be obtained according to the vector superposition principle. On condition that an angle between a vector K1' of the in-coupling grating and the vertical direction is an arbitrary angle $\theta$, an angle between a vector K2' of the turn grating and the vector K1' of the in-coupling grating becomes an arbitrary angle $\varphi$'. A vector K3' of the out-coupling grating parallel to the horizontal direction can also be obtained by superposing the grating vector K1' and the grating vector K2'. Herein, the angle $\theta$ may be any value ranging from −45° to +45°, the angle $\theta$ that is counterclockwise relative to the coordinate axis X is positive, and the angle $\theta$ that is clockwise relative to the coordinate axis X is negative. Only when $\varphi$ satisfies: |90°+$\theta$|+|$\varphi$|<180°, a closed vector triangle can be formed, and the vector K3' of the out-coupling grating can be parallel to the horizontal direction. According to the foregoing derivation, it can be seen that an AR display device constructed with such a waveguide substrate can effectively avoid a rainbow pattern caused by outdoor sunlight.

In the implementation, the direction of the grating vector of the in-coupling grating is perpendicular to the horizontal direction X, that is, the first vector K1 is perpendicular to the horizontal direction X. In other words, an angle between the first vector K1 of the in-coupling grating and the vertical direction Y is zero.

Refer to FIG. 19 and FIG. 20, where FIG. 19 is a schematic diagram of an AR display device provided in an implementation of the disclosure, and FIG. 20 is a schematic diagram illustrating light propagation of the AR display device illustrated in FIG. 19. In this implementation, the grating vector of the out-coupled grating is arranged at a certain angle relative to the horizontal direction X.

FIG. 19 and FIG. 20 illustrate a waveguide architecture in which the grating vector of the out-coupling grating is angled relative to the horizontal direction. The appearance of the in-coupling grating may be any one of a blazed grating, a slanted grating, a binary grating, or a photonic crystal. The appearance of the turn grating may be a binary grating or a photonic crystal, and the appearance of the out-coupling grating may be any one of a blazed grating, a slanted grating, a binary grating, or a photonic crystal. On condition that an angle between the vector (namely, the first vector) K1 of the in-coupling grating and the vertical direction Y is an arbitrary angle $\alpha$, an angle between the vector (namely, the second vector) K2 of the turn grating and the vector K1 of the in-coupling grating becomes an arbitrary angle $\varphi$. The grating vector K3 can also be obtained by superposing the vector K1 and the vector K2, and an angle between K3 and the horizontal direction is $\beta$. The angle between the vector (namely, the first vector) K1 of the in-coupling grating and the vertical direction Y is the arbitrary angle $\alpha$, i.e., in this implementation, the angle between the grating vector of the in-coupling grating and the vertical direction Y is $\alpha$. Herein, the angle $\alpha$ may be any value ranging from −45° to +45°, the angle $\alpha$ that is counterclockwise relative to the coordinate axis is positive, and the angle $\alpha$ that is clockwise relative to the coordinate axis is negative. As illustrated in the figure, the angle $\alpha$ is a negative value and the angle $\beta$ is also a negative value. Only when $\varphi$ satisfies: |90+$\beta$−$\alpha$|+|$\varphi$|<180°, a closed vector triangle can be formed, and the angle $\beta$ between the vector K3' of the out-coupling grating and the horizontal direction can be controlled to be ranged from 45° to +45°. A performance of suppressing the rainbow pattern in the case where the grating vector K3 of the out-coupling grating is arranged at a certain angle relative to the horizontal direction X is not as good as that in the case where the vector (namely, the third vector) K3 of the out-coupling grating is completely and horizontally arranged, but the rainbow pattern can still be suppressed in the case where the light is incident at most incident angles. The smaller the absolute value of the angle $\beta$ is, the more obvious the effect of suppressing the rainbow pattern will be, and vice versa.

Refer to FIG. 3 and FIG. 21 together, where FIG. 21 is a schematic structural view of an out-coupling grating provided in an implementation. The out-coupling grating 140 includes multiple out-coupling units 141 arranged at regular intervals, and an interval of the out-coupling grating 140 is less than or equal to 450 nm.

Generally, for a one-dimensional grating, the grating includes multiple units arranged at regular intervals, and a direction in which the multiple units are arranged at regular intervals is a grating vector. For the out-coupling grating 140, a direction in which the multiple out-coupling units 141 are arranged at regular intervals is the grating vector of the out-coupling grating 140. For a two-dimensional (2D) grating, the 2D grating has two grating vectors. In other words, the 2D grating includes multiple units arranged at regular intervals in a direction and multiple units arranged at regular intervals in another direction. The direction in which the units are arranged at regular intervals is one grating vector in the two grating vectors, and the other direction in which the units are arranged at regular intervals is the other grating vector in the two grating vectors. For the out-coupling grating 140 being a 2D grating, a direction in which the out-coupling units in the 2D grating are arranged at regular intervals is one grating vector in two grating vectors of the out-coupling grating 140, and another direction in which the out-coupling units in the 2D grating are arranged at regular intervals is the other grating vector in the two grating vectors.

It can be easily seen from FIG. 3 that, on condition that a diffraction angle of the light is greater than $\theta$, the light cannot be observed by human due to exiting beyond the diffraction range, and on condition that the diffraction angle of the light is less than θ, the light can be captured by the human eyes due to exiting into the eye movement range. In conclusion, on condition that θ is increasingly small, less rainbow pattern enters the human eyes, and thus the rainbow pattern has less impact on the user experience. When θ is increasingly large, the rainbow effect will be more obvious. That is to say, on the basis of keeping the eye movement range and the eye viewing distance unchanged, on condition that a region of the out-coupling grating 140 is smaller or an interval of the out-coupling grating 140 is smaller, the impact of the rainbow pattern will be weaker.

In the implementation, the interval of the out-coupling grating 140 is less than or equal to 450 nm, so that the impact of the rainbow pattern is relatively weak. Furthermore, the smaller the interval of the out-coupling grating 140 is, the weaker the impact of the rainbow pattern is. In an implementation, the interval of the out-coupling grating 140 is equal to 380 nm.

In an implementation, a region of the out-coupling grating 140 is in a shape of rectangle, and a length of a side of the rectangle satisfies:

$$d = m + l*\tan(FOV/2)*2 \qquad \text{(Formula 5)},$$

where d represents the length of the side of the rectangle, m represents an eye movement range of a user, l represents a distance from eyes of the user to a waveguide plate, and FOV represents a field of vision of an AR display system.

Specifically, in an implementation, d represents a length of a long side of the rectangle and satisfies the formula (5). In another implementation, d represents a length of a short side of the rectangle and satisfies the formula (5). In yet another implementation, the length of the long side $d_1$ of the rectangle and the length of the short side $d_2$ of the rectangle both satisfy the formula (5), i.e., $d_1 = m + l*\tan(FOV/2)*2$ and $d_2 = m + l*\tan(FOV/2)*2$.

In an implementation, an interval of the out-coupling grating 140 is the same as that of the in-coupling grating 120.

The interval of the out-coupling grating 140 is the same as that of the in-coupling grating 120, so that the manufacturing process of the out-coupling grating 140 and the in-coupling grating 120 is relatively convenient.

In another implementation, in an actual design process, the appearance of the out-coupling grating 140 is the same as that of the in-coupling grating 120, so that it is relatively convenient to manufacture the out-coupling grating 140 and the in-coupling grating 120. In another implementation, the interval of the out-coupling grating 140 is the same as that of the in-coupling grating 120, the appearance of the out-coupling grating 140 is the same as that of the in-coupling grating 120, but a height of the out-coupling grating 140 is different from that of the in-coupling grating 120. On condition that the interval of the out-coupling grating 140 is the same as that of the in-coupling grating 120, the appearance of the out-coupling grating 140 is the same as that of the in-coupling grating 120, and the height of the out-coupling grating 140 is different from that of the in-coupling grating 120, the out-coupling grating 140 and the in-coupling grating 120 are a pair of conjugated systems.

It can be understood that, in other implementations, the interval of the out-coupling grating 140 may also be different from that of the in-coupling grating 120. The appearance of the out-coupling grating 140 may also be different from that of the in-coupling grating 120.

In the AR display device 1 provided in the implementation of the disclosure, there is no special requirement on the appearance of the out-coupling grating 140. The appearance of the out-coupling grating 140 may be any one of a blazed grating, a slanted grating, a binary grating, or a photonic crystal.

The following will describe positional relationships of the in-coupling grating 120, the turn grating 130, and the out-coupling grating 140 relative to the waveguide substrate 110. It should be noted that, the following accompanying drawings illustrate only the positional relationships of the in-coupling grating 120, the turn grating 130, and the out-coupling grating 140 relative to the waveguide substrate 110, but the appearances and specific structures of the in-coupling grating 120, the turn grating 130, and the out-coupling grating 140 are not illustrated.

Refer to FIGS. 22 to 29, where FIG. 22 is a schematic perspective diagram of an AR display device provided in another implementation of the disclosure, and FIG. 23 is a side view of the AR display device in FIG. 22. In FIG. 22 and FIG. 23, the in-coupling grating 120, the turn grating 130, and the out-coupling grating 140 are disposed at the same side of the waveguide substrate 110 and disposed on an inner surface 112 of the waveguide substrate 110.

FIG. 24 is a schematic perspective diagram of an AR display device provided in yet another implementation of the disclosure, and FIG. 25 is a side view of the AR display device in FIG. 24. In FIG. 24 and FIG. 25, the in-coupling grating 120, the turn grating 130, and the out-coupling grating 140 are disposed at the same side of the waveguide substrate 110 and disposed on an outer surface 111 of the waveguide substrate 110.

FIG. 26 is a schematic perspective diagram of an AR display device provided in yet another implementation of the disclosure, and FIG. 27 is a partial side view of the AR display device in FIG. 26. In FIG. 26 and FIG. 27, the in-coupling grating 120 and the turn grating 130 are disposed at the same side of the waveguide substrate 110, the out-coupling grating 140 is disposed at the other side of the waveguide substrate 110. The in-coupling grating 120 and the turn grating 130 are disposed on the inner surface 112 of the waveguide substrate 110, and the out-coupling grating 140 is disposed on the outer surface 111 of the waveguide substrate 110.

Figure 28:
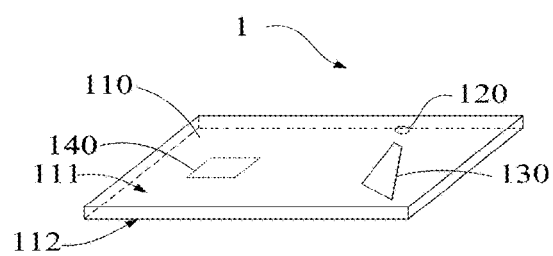
FIG. 28 is a schematic perspective diagram of an AR display device provided in yet another implementation of the disclosure.
Figure 29:
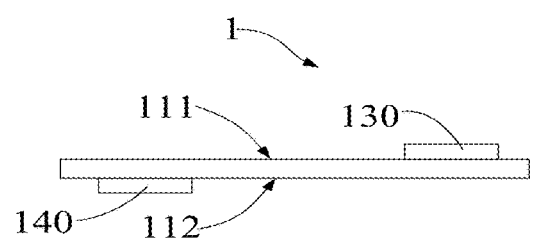
FIG. 29 is a partial side view of the AR display device in FIG. 28.

FIG. 28 is a schematic perspective diagram of an AR display device provided in yet another implementation of the disclosure, and FIG. 29 is a partial side view of the AR display device in FIG. 28. In FIG. 28 and FIG. 29, the in-coupling grating 120 and the turn grating 130 are disposed at one side of the waveguide substrate 110, the out-coupling grating 140 is disposed at the other side of the waveguide substrate 110. The in-coupling grating 120 and the turn grating 130 are disposed on the outer surface 111 of the waveguide substrate 110, and the out-coupling grating 140 is disposed on the inner surface 112 of the waveguide substrate 110.

The above arrangement relationships of the in-coupling grating 120, the turn grating 130, the out-coupling grating 140, and the waveguide substrate 110 may make arrangement of the in-coupling grating 120, the out-coupling grating 140, and the waveguide substrate 110 more easier. It should be noted that, regardless of the positions of the in-coupling grating 120, the turn grating 130, the out-coupling grating 140, and the waveguide substrate 110, the rainbow effect can be suppressed by controlling the angle between the vector of the out-coupling grating and the horizontal direction.

In an implementation, the out-coupling grating 140 and the waveguide substrate 110 are integrally formed.

The out-coupling grating 140 may be formed on a substrate through stamping, i.e., a stamped portion of the substrate forms the out-coupling grating 140, and a non-stamped portion of the substrate forms the waveguide substrate 110. Therefore, the out-coupling grating 140 and the waveguide substrate 110 are integrally formed.

In another implementation, the in-coupling grating 120 and the waveguide substrate 110 are integrally formed. Specifically, the in-coupling grating 120 may be formed on a substrate through stamping, that is, a stamped portion of the substrate forms the in-coupling grating 120, and a non-stamped portion of the substrate forms the waveguide substrate 110. Therefore, the in-coupling grating 120 and the waveguide substrate 110 are integrally formed.

In another implementation, the in-coupling grating 120, the out-coupling grating 140, and the waveguide substrate 110 are integrally formed. Specifically, the in-coupling grating 120 and the out-coupling grating 140 may be formed on a substrate through stamping, that is, a stamped portion of the substrate forms the in-coupling grating 120 and the out-coupling grating 140, and a non-stamped portion of the substrate forms the waveguide substrate 110. Therefore, the in-coupling grating 120, the out-coupling grating 140, and the waveguide substrate 110 are integrally formed.

Figure 30:
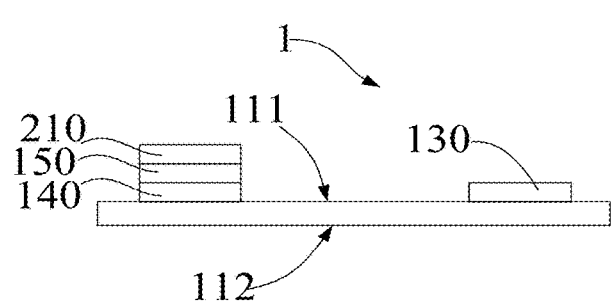
FIG. 30 is a schematic diagram of an AR display device provided in another implementation of the disclosure.

Refer to FIG. 30, where FIG. 30 is a schematic diagram of an AR display device provided in another implementation of the disclosure. In the implementation, the AR display device 1 includes a waveguide substrate 110, an in-coupling grating 120, and an out-coupling grating 140. In addition, the AR display device 1 further includes a polarizer 150. For the waveguide substrate 110, the in-coupling grating 120, and the out-coupling grating 140, reference can be made to the foregoing description, which will not be repeated herein. Light exited from the polarizer 150 enters the out-coupling grating 140, and a polarization direction of the polarizer 150 is the horizontal direction X Reflected light of the sunlight reflected by glass or the like in the environment is usually polarized in the Y-axis direction. The polarization direction of the polarizer 150 being set to the horizontal direction X can filter out the reflected light polarized in the Y-axis direction in the environment, thereby further avoiding the rainbow pattern.

The waveguide substrate 110 has an outer surface 111 and an inner surface 112 opposite the outer surface 111. In the implementation, the polarizer 150 and the out-coupling grating 140 are disposed on the outer surface 111 of the waveguide substrate 110, and the polarizer 150 is farther away from the waveguide substrate 110 than the out-coupling grating 140.

Furthermore, in the implementation, the AR display device 1 further includes a protective sheet 210. A material of the protective sheet 210 may be, but is not limited to, glass, plastic, and the like. The protective sheet 210 is disposed on a surface of the polarizer 150 away from the out-coupling grating 140 and is configured to protect the polarizer 150 from being damaged. It may be appreciated that in other implementations, the AR display device 1 may not include the protective sheet 210.

In the schematic diagram of the implementation, for example, the AR display device 1 includes the polarizer 150 and the protective sheet 210, and the polarizer 150 and the protective sheet 210 are combined into the AR display device 1 provided in the foregoing implementation. It can be understood that, the polarizer 150 and the protective sheet 210 in the AR display device 1 may also be combined into other implementations, for example, combined into the implementation where the in-coupling grating 120 is disposed on the inner surface 112.

Figure 31:
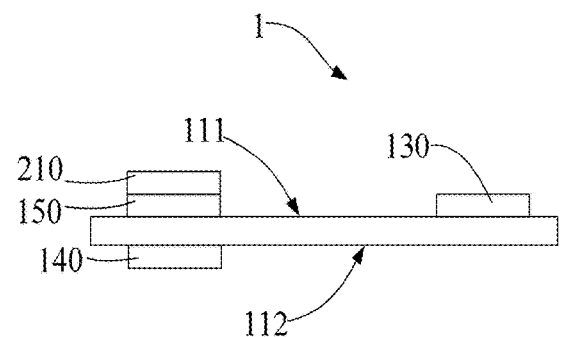
FIG. 31 is a schematic diagram of an AR display device provided in yet another implementation of the disclosure.
Figure 36:
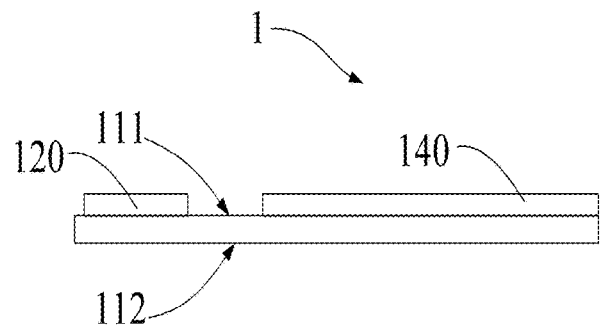
FIG. 36 to FIG. 39 are side views of an AR display device in implementations.

Referring to FIG. 31, where FIG. 31 is a schematic diagram of an AR display device provided in yet another implementation of the disclosure. In the implementation, the AR display device 1 further includes a polarizer 150. Light exited from the polarizer 150 enters the out-coupling grating 140, and a polarization direction of the polarizer 150 is the horizontal direction X. In the implementation, the waveguide substrate 110 has an outer surface 111 and an inner surface 112 opposite the outer surface 111, the polarizer 150 is disposed on the outer surface 111 of the waveguide substrate 110, and the out-coupling grating 140 is disposed on the inner surface 112 of the waveguide substrate 110.

Furthermore, in the implementation, the AR display device 1 further includes a protective sheet 210. A material of the protective sheet 210 may be, but is not limited to, glass, plastic, and the like. The protective sheet 210 is disposed on a surface of the polarizer 150 away from the waveguide substrate 110 and is configured to protect the polarizer 150 from being damaged. It may be appreciated that in other implementations, the AR display device 1 may not include the protective sheet 210.

In an implementation, the polarizer 150 is a coated polarizer. In other words, the polarizer 150 is formed through coating. When the polarizer 150 and the out-coupling grating 140 are disposed on the outer surface 111 of the waveguide substrate 110 and the polarizer 150 is farther away from the waveguide substrate 110 than the out-coupling grating 140, the polarizer 150 is a film coated on the outer surface 111 of the out-coupling grating 140. When the polarizer 150 is disposed on the outer surface 111 of the waveguide substrate 110 and the out-coupling grating 140 is disposed on the inner surface 112 of the waveguide substrate 110, the polarizer 150 is a film coated on the outer surface 111 of the waveguide substrate 110. In another implementation, the polarizer 150 is in a monolithic form, and the polarizer 150 is bonded to the out-coupling grating 140 or the waveguide substrate 110 by an adhesive member such as glue.

The polarizer 150 is a coated polarizer, which makes the polarizer 150 relatively thin and easy to be manufactured.

Refer to FIG. 32, where FIG. 32 is a schematic diagram of a near-eye display device provided in an implementation of the disclosure. The near-eye display device 2 includes the AR display device 1 provided in any one of the foregoing implementations.

In an implementation, the near-eye display device 2 further includes a wearable rim 160. The wearable rim 160 has two window regions 161 spaced apart from each other, and the out-coupling grating 140 is disposed in at least one window region 161 of the two window regions 161.

On condition that the out-coupling grating 140 is disposed in one window region 161 of the two window regions 161, the one window region 161 can enable human to see a virtual image, and ambient light can pass through a region of the in-coupling grating 120, so that one window region 161 can achieve AR. On condition that the out-coupling grating 140 is disposed in each of the two window regions 161, the two window regions 161 can achieve AR. In the schematic diagram of the implementation, for example, the out-coupling grating 140 is disposed in each of the two window regions 161.

Refer to FIG. 33, where FIG. 33 is a schematic diagram of a near-eye display device provided in another implementation of the disclosure. The near-eye display device 2 further includes a wearable rim 160, a wearable temple 170, an image source 180, and an optical lens assembly 190. The wearable temple 170 is connected to the wearable rim 160. The image source 180 is also referred to as a projector. The image source 180 is disposed at one side of the waveguide base 110 and configured to generate light according to an image to-be-displayed. The optical lens assembly 190 is disposed between the image source 180 and the in-coupling grating 120 and configured to project the light into the in-coupling grating 120 according to a preset rule. At least one of the image source 180 or the optical lens assembly 190 is disposed at a connection position between the wearable rim 160 and the wearable temple 170.

The near-eye display device 2 includes the wearable rim 160 and further includes the wearable temple 170. Specifically, the AR display device 1 is a pair of AR glasses, and the wearable temple 170 is also referred to as a glass temple. The image source 180 is a device for image generation, such as a micro-light-emitting diode (LED) display device.

When the AR display device 1 is a pair of AR glasses, in order to enable the waveguide-substrate structure formed by the waveguide substrate 110, the in-coupling grating 120, the turn grating 130, and the out-coupling grating 140 to fit with a form of the glasses as much as possible, the in-coupling grating 120 can be disposed at the connection position between the wearable rim 160 and the wearable temple 170. By adopting a side-projection layout, the image source 180 and the optical lens assembly 190 are placed at the connection position between the wearable rim 160 and the wearable temple 170, and the in-coupling grating 120 is laid out at one side of the window region 161. On condition that the AR display device 1 has two window regions 161, the two in-coupling gratings 120 are disposed at two opposite sides of the two window regions 161, respectively. When the pair of AR glasses is worn, the two in-coupling gratings 120 are distributed at two opposite sides of human eyes, respectively.

Refer to FIG. 34 and FIG. 35, where FIG. 34 is a schematic diagram of an AR display device provided in yet another implementation of the disclosure, and FIG. 35 is a schematic diagram illustrating superposition of the vectors of the AR display device illustrated in FIG. 34. In the implementation, the AR display device 1 includes a waveguide substrate 110, an in-coupling grating 120, and an out-coupling grating 140. The in-coupling grating 120 is disposed on the waveguide substrate 110 and configured to couple light into the waveguide substrate 110. A grating vector of the in-coupling grating 120 is a first vector k1. The out-coupling grating 140 is disposed on the waveguide substrate 110 and configured to couple the light in the waveguide substrate 110 out of the waveguide substrate 110. The out-coupling grating 140 has a second vector k2 and a third vector k3. The first vector k1, the second vector k2, and the third vector k3 form a closed vector triangle. When the AR display device 1 is used, an angle between the second vector k2 and a horizontal direction X is less than or equal to 45°, and an angle between the third vector k3 and the horizontal direction X is less than or equal to 45°.

For the waveguide substrate 110, reference can be made to the foregoing description, which will not be repeated herein. The out-coupling grating 140 has the second vector k2 and the third vector k3, and thus the out-coupling grating 140 is a 2D grating.

In FIG. 34 and FIG. 35, the grating vector k1 of the in-coupling grating 120 is parallel to the horizontal direction X, and the out-coupling grating 140 is a 2D grating and thus has grating vectors in two directions, i.e., the second vector k2 and the third vector k3. An angle between the second vector k2 and the horizontal direction X is denoted as $\theta 1$, and an angle between the third vector k3 and the horizontal direction X is denoted as $\theta 2$, where superposition of the vectors is illustrated by a solid line in FIG. 35. The rainbow pattern can be better suppressed on condition that $\theta 1$ is less than or equal to 45° and $\theta 2$ is less than or equal to 45°, and the effect of suppressing the rainbow pattern becomes more obvious as $\theta 1$ and $\theta 2$ become smaller. On condition that the direction of the first vector k1' (illustrated by a dotted line in FIG. 35) of the in-coupling grating 120 is not parallel to the horizontal direction X but is arranged at an angle $\alpha$ relative to the horizontal direction X, the rainbow pattern can still be better suppressed as long as $\theta 1$ is controlled to be less than or equal to 45° and $\theta 2$ is controlled to be less than or equal to 45°. The smaller the angle $\alpha$ is, the more obvious the suppression of the rainbow pattern will be.

It can be seen therefrom that when the AR display device 1 is used, the angle between the second vector k2 and the horizontal direction X is less than or equal to 45°, and the angle between the third vector k3 and the horizontal direction X is less than or equal to 45°, which can weaken or even eliminate the rainbow effect.

In an implementation, the angle between the second vector k2 and the horizontal direction X is less than or equal to 30°, and the angle between the third vector k3 and the horizontal direction X is less than or equal to 30°.

In an implementation, on condition that the angle between the second vector k2 and the horizontal direction X is less than or equal to 30° and the angle between the third vector k3 and the horizontal direction X is less than or equal to 30°, even in the morning or toward evening, the rainbow pattern hardly appears. Therefore, in an implementation, on condition that the angle between the second vector k2 and the horizontal direction X is less than or equal to 30° and the angle between the third vector k3 and the horizontal direction X is less than or equal to 30°, the −1st order transmitted light through the out-coupling grating 140 can deviate from the eye movement range more effectively, thereby alleviating the rainbow pattern more effectively.

It should be noted that, in practical applications, selection of the value of the angle between the second vector k2 and the horizontal direction X and the value of the angle between the third vector k3 and the horizontal direction X takes account of alleviating the rainbow pattern, imaging factors of the AR display device, and the like.

In this implementation, the first vector K1, the second vector K2, and the third vector K3 form the closed vector triangle to ensure that the AR display device 1 can form an image.

In an implementation, the angle $\theta 1$ between the second vector k2 and the horizontal direction X is less than or equal to 45°, the angle $\theta 2$ between the third vector k3 and the horizontal direction X is less than or equal to 45°, and the angle $\theta 1$ between the second vector k2 and the horizontal direction X is equal to the angle $\theta 2$ between the third vector k3 and the horizontal direction X. On condition that $\theta 1$ is equal to $\theta 2$, the out-coupling grating 140 is easier to be manufactured, the process for manufacturing the out-coupling grating 140 is less difficult, and the rainbow pattern can be better weakened.

It can be understood that, in other implementations, the angle $\theta 1$ between the second vector k2 and the horizontal direction X is less than or equal to 45°, the angle $\theta 2$ between the third vector k3 and the horizontal direction X is less than or equal to 45°, and the angle $\theta 1$ between the second vector k2 and the horizontal direction X is not equal to the angle $\theta 2$ between the third vector k3 and the horizontal direction X.

The rainbow pattern can be weakened upon satisfying that the angle θ1 between the second vector k2 and the horizontal direction X is less than or equal to 45° and the angle θ2 between the third vector k3 and the horizontal direction X is less than or equal to 45°.

The out-coupling grating 140 is a stereoscopic grating that is in a preset pattern in the XY plane and extends in the Z direction, where the preset pattern is any one of a circle, a T-shape, or a rhombus.

Figure 37:
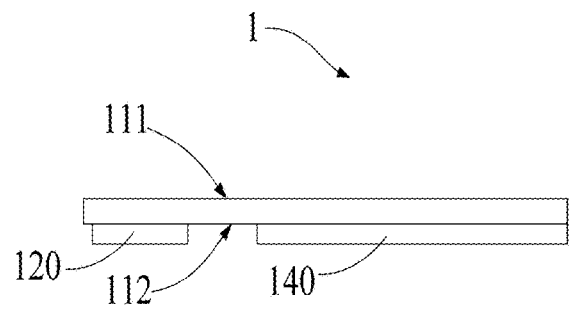
Figure 38:
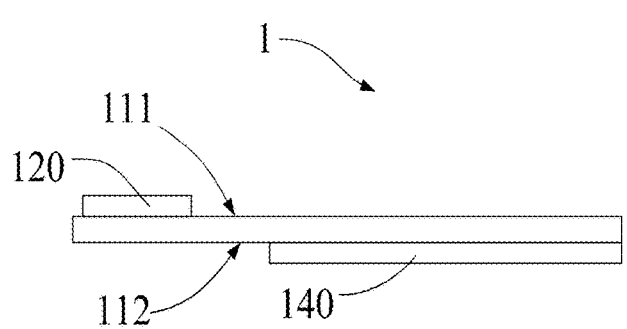
Figure 39:
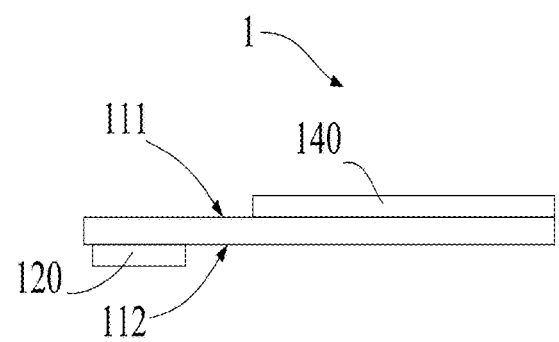

The in-coupling grating 120 and the out-coupling grating 140 are disposed at the same side of the waveguide substrate 110, or disposed at two opposite sides of the waveguide substrate 110, respectively. Referring to FIGS. 36 to 39 together, in FIG. 36, the in-coupling grating 120 and the out-coupling grating 140 are disposed at the same side of the waveguide substrate 110, specifically, disposed on the outer surface 111 of the waveguide substrate 110. In FIG. 37, the in-coupling grating 120 and the out-coupling grating 140 are disposed at the same side of the waveguide substrate 110, specifically, disposed on the inner surface 112 of the waveguide substrate 110. In FIG. 38, the in-coupling grating 120 is disposed on the outer surface 111 of the waveguide substrate 110, and the out-coupling grating 140 is disposed on the inner surface 112 of the waveguide substrate 110. In FIG. 39, the in-coupling grating 120 is disposed on the inner surface 112 of the waveguide substrate 110, and the out-coupling grating 140 is disposed on the outer surface 111 of the waveguide substrate 110.

In an implementation, the out-coupling grating 140 and the waveguide substrate 110 are integrally formed.

The out-coupling grating 140 may be formed on a substrate through stamping, i.e., a stamped portion of the substrate forms the out-coupling grating 140, and a non-stamped portion of the substrate forms the waveguide substrate 110. Therefore, the out-coupling grating 140 and the waveguide substrate 110 are integrally formed.

In another implementation, the in-coupling grating 120 and the waveguide substrate 110 are integrally formed. Specifically, the in-coupling grating 120 may be formed on a substrate through stamping, that is, a stamped portion of the substrate forms the in-coupling grating 120, and a non-stamped portion of the substrate forms the waveguide substrate 110. Therefore, the in-coupling grating 120 and the waveguide substrate 110 are integrally formed.

In another implementation, the in-coupling grating 120, the out-coupling grating 140, and the waveguide substrate 110 are integrally formed. Specifically, the in-coupling grating 120 and the out-coupling grating 140 may be formed on a substrate through stamping, that is, a stamped portion of the substrate forms the in-coupling grating 120 and the out-coupling grating 140, and a non-stamped portion of the substrate forms the waveguide substrate 110. Therefore, the in-coupling grating 120, the out-coupling grating 140, and the waveguide substrate 110 are integrally formed.

Figure 40:
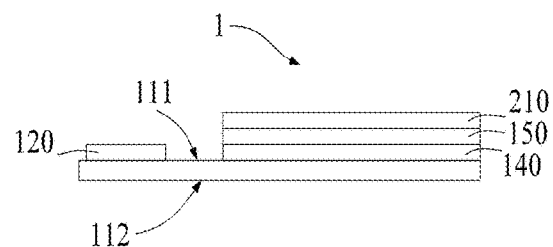
FIG. 40 is a schematic diagram of an AR display device provided in another implementation of the disclosure.

Refer to FIG. 40, where FIG. 40 is a schematic diagram of an AR display device provided in another implementation of the disclosure. In the implementation, the AR display device 1 includes a waveguide substrate 110, an in-coupling grating 120, and an out-coupling grating 140. In addition, the AR display device 1 further includes a polarizer 150. For the waveguide substrate 110, the in-coupling grating 120, and the out-coupling grating 140, reference can be made to the foregoing description, which will not be repeated herein. Light exited from the polarizer 150 enters the out-coupling grating 140, and a polarization direction of the polarizer 150 is parallel to the second vector k2 or the third vector k3, or between the second vector k2 and the third vector k3.

Reflected light of the sunlight reflected by glass or the like in the environment is usually polarized in the Y-axis direction. The polarization direction of the polarizer 150 being set to be parallel to the second vector k2 or the third vector k3, or between the second vector k2 and the third vector k3 can filter out part of the reflected light polarized in the Y-axis direction in the environment, thereby further avoiding the rainbow pattern.

The waveguide substrate 110 has an outer surface 111 and an inner surface 112 opposite the outer surface 111. In the implementation, the polarizer 150 and the out-coupling grating 140 are disposed on the outer surface 111 of the waveguide substrate 110, and the polarizer 150 is farther away from the waveguide substrate 110 than the out-coupling grating 140.

Furthermore, in the implementation, the AR display device 1 further includes a protective sheet 210. A material of the protective sheet 210 may be, but is not limited to, glass, plastic, and the like. The protective sheet 210 is disposed on a surface of the polarizer 150 away from the out-coupling grating 140 and is configured to protect the polarizer 150 from being damaged. It may be appreciated that, in other implementations, the AR display device 1 may not include the protective sheet 210.

Figure 41:
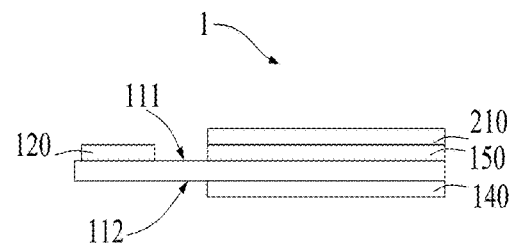
FIG. 41 is a schematic diagram of an AR display device provided in yet another implementation of the disclosure.

Refer to FIG. 41, where FIG. 41 a schematic diagram of an AR display device provided in yet another implementation of the disclosure. In the implementation, the AR display device 1 includes a waveguide substrate 110, an in-coupling grating 120, and an out-coupling grating 140. In addition, the AR display device 1 further includes a polarizer 150. For the waveguide substrate 110, the in-coupling grating 120, and the out-coupling grating 140, reference can be made to the foregoing description, which will not be repeated herein. Light exited from the polarizer 150 enters the out-coupling grating 140, and a polarization direction of the polarizer 150 is parallel to the second vector k2 or the third vector k3, or between the second vector k2 and the third vector k3.

The waveguide substrate 110 has an outer surface 111 and an inner surface 112 opposite the outer surface 111. The polarizer 150 is disposed on the outer surface 111 of the waveguide substrate 110, and the out-coupling grating 140 is disposed on the inner surface 112 of the waveguide substrate 110.

Furthermore, in the implementation, the AR display device 1 further includes a protective sheet 210. A material of the protective sheet 210 may be, but is not limited to, glass, plastic, and the like. The protective sheet 210 is disposed on a surface of the polarizer 150 away from the waveguide substrate 110 and is configured to protect the polarizer 150 from being damaged. It may be appreciated that, in other implementations, the AR display device 1 may not include the protective sheet 210.

In an implementation, the polarizer 150 is a coated polarizer. In other words, the polarizer 150 is formed through coating. When the polarizer 150 and the out-coupling grating 140 are disposed on the outer surface 111 of the waveguide substrate 110 and the polarizer 150 is farther away from the waveguide substrate 110 than the out-coupling grating 140, the polarizer 150 is a film coated on the outer surface 111 of the out-coupling grating 140. When the polarizer 150 is disposed on the outer surface 111 of the waveguide substrate 110 and the out-coupling grating 140 is disposed on the inner surface 112 of the waveguide substrate 110, the polarizer 150 is a film coated on the outer surface 111 of the waveguide substrate 110. In another implementation, the polarizer 150 is in a monolithic form, and the polarizer 150 is bonded to the out-coupling grating 140 or the waveguide substrate 110 by an adhesive member such as glue.

The polarizer 150 is a coated polarizer, which makes the polarizer 150 relatively thin and easy to be manufactured.

Figure 42:
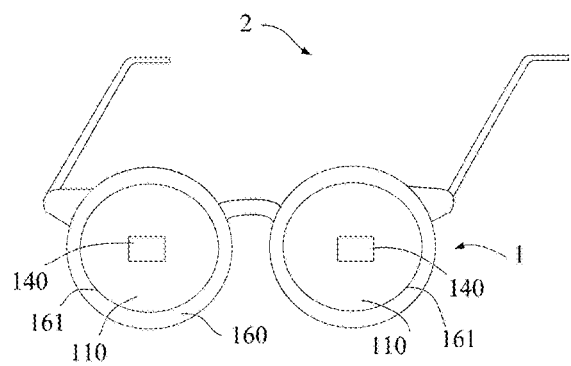
FIG. 42 is a schematic diagram of a near-eye display device provided in yet another implementation of the disclosure.

Refer to FIG. 42, where FIG. 42 is a schematic diagram of a near-eye display device provided in yet another implementation of the disclosure. The near-eye display device 2 includes the AR display device 1 provided in any one of the foregoing implementations.

In an implementation, the near-eye display device 2 further includes a wearable rim 160. The wearable rim 160 has two window regions 161 spaced apart from each other, and the out-coupling grating 140 is disposed in at least one window region 161 of the two window regions 161.

On condition that the out-coupling grating 140 is disposed in one window region 161 of the two window regions 161, the one window region 161 can enable human to see a virtual image, and ambient light can pass through a region of the in-coupling grating 120, so that one window region 161 can achieve AR. On condition that the out-coupling grating 140 is disposed in each of the two window regions 161, the two window regions 161 can achieve AR. In the schematic diagram of the implementation, for example, the out-coupling grating 140 is disposed in each of the two window regions 161.

Figure 43:
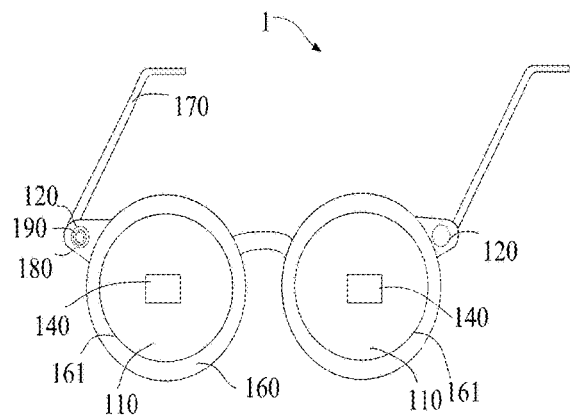
FIG. 43 is a schematic diagram of a near-eye display device provided in yet another implementation of the disclosure.

Refer to FIG. 43, where FIG. 43 is a schematic diagram of a near-eye display device provided in yet another implementation of the disclosure. The near-eye display device 2 includes the AR display device 1 provided in any one of the foregoing implementations.

In an implementation, the near-eye display device 2 further includes a wearable rim 160, a wearable temple 170, an image source 180, and an optical lens assembly 190. The wearable temple 170 is connected to the wearable rim 160. The image source 180 is disposed at one side of the waveguide base 110 and configured to generate light according to an image to-be-displayed. The optical lens assembly 190 is disposed between the image source 180 and the in-coupling grating 120 and configured to project the light into the in-coupling grating 120 according to a preset rule. At least one of the image source 180 or the optical lens assembly 190 is disposed at a connection position between the wearable rim 160 and the wearable temple 170.

The near-eye display device 2 further includes the wearable rim 160 and further includes the wearable temple 170. Specifically, the AR display device 1 is a pair of AR glasses. The image source 180 is a device for image generation, such as a micro-LED display device.

When the AR display device 1 is a pair of AR glasses, in order to enable the waveguide-substrate structure formed by the waveguide substrate 110, the in-coupling grating 120, and the out-coupling grating 140 to fit with a form of the glasses as much as possible, the in-coupling grating 120 can be disposed at the connection position between the wearable rim 160 and the wearable temple 170. By adopting a side-projection layout, the image source 180 and the optical lens assembly 190 are placed at the connection position between the wearable rim 160 and the wearable temple 170, and the in-coupling grating 120 is laid out at one side of the window region 161. On condition that the AR display device 1 has two window regions 161, the two in-coupling gratings 120 are disposed at two opposite sides of the two window regions 161, respectively. When the pair of AR glasses is worn, the two in-coupling gratings 120 are distributed at two opposite sides of human eyes, respectively.

In an implementation, the AR display device 1 may be disposed on a windshield of a vehicle, for example, the AR display device 1 may be disposed at one side of the windshield of the vehicle close to human eyes. The AR display device 1 may be directly attached to the windshield glass, or may not be directly attached to the windshield and is spaced apart from the windshield.

Figure 44:
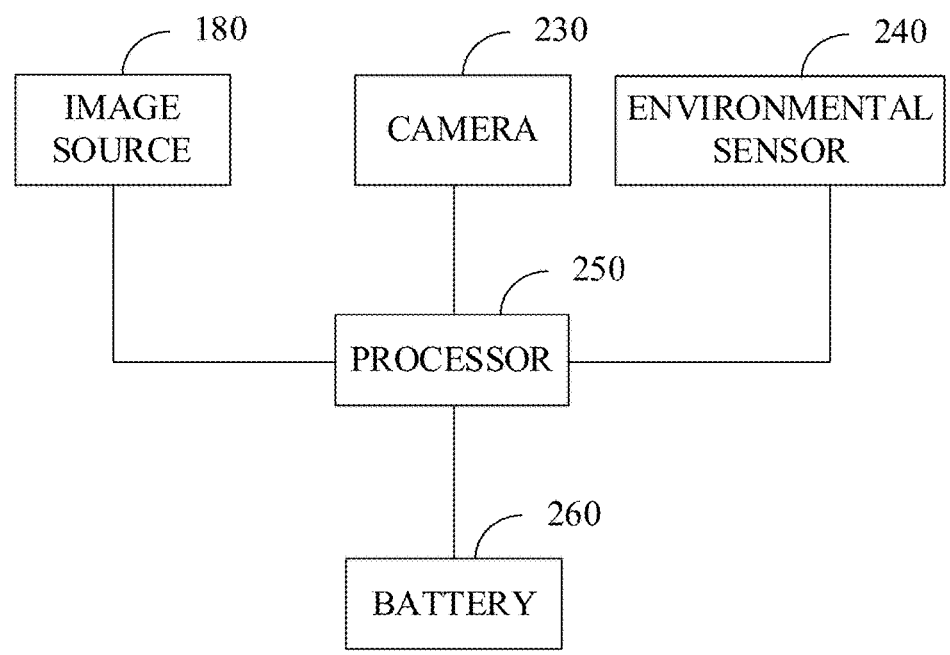
FIG. 44 is a schematic diagram of a near-eye display device provided in another implementation of the disclosure.

Refer to FIG. 44, where FIG. 44 is a schematic diagram of a near-eye display device provided in another implementation of the disclosure. The near-eye display device 2 further includes a camera 230, an environmental sensor 240, a processor 250, and a battery 260. The image source 180, the camera 230, and the environmental sensor 240 each are electrically connected to the processor 250 and configured to operate under the control of the processor 250. The camera 230 is configured to collect video data, and the environmental sensor 240 is configured to detect a surrounding environment. The battery 260 is configured to supply power to the image source 180, the camera 230, and the environmental sensor 240.

Principles and implementations of the present disclosure are elaborated with specific implementations herein. The above illustration of implementations is only used to help to understand core ideas of the present disclosure. At the same time, for those of ordinary skill in the art, according to ideas of the present disclosure, there will be changes in specific implementations and application scope. In summary, contents of this specification should not be understood as a limitation to the present disclosure.

What is claimed is:

1. An augmented reality (AR) display device, comprising:
   a waveguide substrate;
   an in-coupling grating disposed on the waveguide substrate and configured to couple light into the waveguide substrate, wherein a grating vector of the in-coupling grating is a first vector K1;
   a turn grating disposed on the waveguide substrate and configured to perform pupil expansion on the light coupled into the waveguide substrate by the in-coupling grating, wherein a grating vector of the turn grating serves is a second vector K2; and
   an out-coupling grating disposed on the waveguide substrate, wherein the out-coupling grating is configured to receive the light that is subject to the pupil expansion by the turn grating and couple the light out of the waveguide substrate, a grating vector of the out-coupling grating is a third vector K3, the first vector K1, the second vector K2, and the third vector K3 form a closed vector triangle, and an angle A between a direction of the third vector K3 and a horizontal direction X satisfies: $-45° \leq A \leq 45°$ when the AR display device is used;
   wherein a region of the out-coupling grating is in a shape of rectangle, and a length of a side of the rectangle satisfies: $d = m + l^*\tan(FOV/2)^*2$,
   wherein d represents the length of the side of the rectangle, m represents an eye movement range of a user, l represents a distance from eyes of the user to a waveguide plate, and FOV represents a field of vision of an AR display system.

2. The AR display device of claim 1, wherein the angle A between the direction of the third vector K3 and the horizontal direction X satisfies: $-30° \leq A \leq 30°$.

3. The AR display device of claim 1, wherein the out-coupling grating comprises a plurality of out-coupling units arranged at regular intervals, and an interval of the out-coupling grating is less than or equal to 450 nm.

4. The AR display device of claim 1, wherein an interval of the out-coupling grating is the same as that of the in-coupling grating.

5. The AR display device of claim 1, wherein the in-coupling grating and the out-coupling grating are disposed at a same side of the waveguide substrate, or disposed at two opposite sides of the waveguide substrate, respectively.

6. The AR display device of claim 5, wherein the out-coupling grating and the waveguide substrate are integrally formed.

7. The AR display device of claim 1, further comprising:
a polarizer, wherein light exited from the polarizer enters the out-coupling grating, and a polarization direction of the polarizer is the horizontal direction X.

8. The AR display device of claim 7, wherein the waveguide substrate has an outer surface and an inner surface opposite the outer surface, the polarizer and the out-coupling grating are disposed on the outer surface of the waveguide substrate, and the polarizer is farther away from the waveguide substrate than the out-coupling grating.

9. The AR display device of claim 7, wherein the waveguide substrate has an outer surface and an inner surface opposite the outer surface, the polarizer is disposed on the outer surface of the waveguide substrate, and the out-coupling grating is disposed on the inner surface of the waveguide substrate.

10. An augmented reality (AR) display device, comprising:
a waveguide substrate;
an in-coupling grating disposed on the waveguide substrate and configured to couple light into the waveguide substrate, wherein a grating vector of the in-coupling grating is a first vector K1; and
an out-coupling grating disposed on the waveguide substrate and configured to couple the light in the waveguide substrate out of the waveguide substrate, wherein the out-coupling grating has a second vector k2 and a third vector k3, the first vector K1, the second vector k2, and the third vector k3 form a closed vector triangle, and when the AR display device is used, an angle between the second vector k2 and a horizontal direction X is less than or equal to 45°, and an angle between the third vector k3 and the horizontal direction X is less than or equal to 45°.

11. The AR display device of claim 10, wherein the angle between the second vector k2 and the horizontal direction X is less than or equal to 30°, and the angle between the third vector k3 and the horizontal direction X is less than or equal to 30°.

12. The AR display device of claim 10, wherein the angle between the second vector k2 and the horizontal direction X is equal to the angle between the third vector k3 and the horizontal direction X.

13. The AR display device of claim 10, wherein the in-coupling grating and the out-coupling grating are disposed at a same side of the waveguide substrate, or disposed at two opposite sides of the waveguide substrate, respectively.

14. The AR display device of claim 13, wherein the out-coupling grating and the waveguide substrate are integrally formed.

15. The AR display device of claim 10, further comprising:
a polarizer, wherein light exited from the polarizer enters the out-coupling grating, and a polarization direction of the polarizer is parallel to the second vector k2 or the third vector k3, or between the second vector k2 and the third vector k3.

16. The AR display device of claim 10, wherein the out-coupling grating is a stereoscopic grating that is in a preset pattern in an XY plane and extends in a Z direction, wherein the preset pattern is any one of a circle, a T-shape, or a rhombus.

17. A near-eye display device, comprising an augmented reality (AR) display device, wherein the AR display device comprises:
a waveguide substrate;
an in-coupling grating disposed on the waveguide substrate and configured to couple light into the waveguide substrate, wherein a grating vector of the in-coupling grating is a first vector K1;
a turn grating disposed on the waveguide substrate and configured to perform pupil expansion on the light coupled into the waveguide substrate by the in-coupling grating, wherein a grating vector of the turn grating serves is a second vector K2; and
an out-coupling grating disposed on the waveguide substrate, wherein the out-coupling grating is configured to receive the light that is subject to the pupil expansion by the turn grating and couple the light out of the waveguide substrate, a grating vector of the out-coupling grating is a third vector K3, the first vector K1, the second vector K2, and the third vector K3 form a closed vector triangle, and an angle A between a direction of the third vector K3 and a horizontal direction X satisfies: $-45° \leq A \leq 45°$ when the AR display device is used;
wherein a region of the out-coupling grating is in a shape of rectangle, and a length of a side of the rectangle satisfies: $d = m + l*\tan(FOV/2)*2$,
wherein d represents the length of the side of the rectangle, m represents an eye movement range of a user, l represents a distance from eyes of the user to a waveguide plate, and FOV represents a field of vision of an AR display system.

18. The near-eye display device of claim 17, comprising:
a wearable rim, wherein the wearable rim has two window regions spaced apart from each other, and the out-coupling grating is disposed in at least one window region of the two window regions.

19. The near-eye display device of claim 18, further comprising:
a wearable temple connected to the wearable rim;
an image source disposed at one side of the waveguide substrate and configured to generate light according to an image to-be-displayed; and
an optical lens assembly disposed between the image source and the in-coupling grating and configured to project the light into the in-coupling grating according to a preset rule, wherein at least one of the image source or the optical lens assembly is disposed at a connection position between the wearable rim and the wearable temple.

* * * * *